US008743976B2

(12) United States Patent
Smith et al.

(10) Patent No.: US 8,743,976 B2
(45) Date of Patent: Jun. 3, 2014

(54) TECHNIQUES AND SYSTEMS FOR COMMUNICATIONS BASED ON TIME REVERSAL PRE-CODING

(75) Inventors: David F. Smith, Ellicott City, MD (US); Anis Husain, San Diego, CA (US)

(73) Assignee: Ziva Corporation, San Diego, CA (US)

( * ) Notice: Subject to any disclaimer, the term of this patent is extended or adjusted under 35 U.S.C. 154(b) by 0 days.

(21) Appl. No.: 13/142,236

(22) PCT Filed: Sep. 3, 2010

(86) PCT No.: PCT/US2010/047922
§ 371 (c)(1),
(2), (4) Date: Aug. 5, 2011

(87) PCT Pub. No.: WO2011/029075
PCT Pub. Date: Mar. 10, 2011

(65) Prior Publication Data
US 2011/0286508 A1    Nov. 24, 2011

Related U.S. Application Data

(60) Provisional application No. 61/239,765, filed on Sep. 3, 2009, provisional application No. 61/239,761, filed on Sep. 3, 2009.

(51) Int. Cl.
*H04L 27/00*   (2006.01)
(52) U.S. Cl.
USPC ........... 375/259; 375/298; 375/306; 375/307; 375/327; 375/340
(58) Field of Classification Search
USPC .................. 375/259, 298, 306, 307, 327, 340
See application file for complete search history.

(56) References Cited

U.S. PATENT DOCUMENTS

| 5,092,336 | A | 3/1992 | Fink |
| 5,155,742 | A | 10/1992 | Ariyavisitakul et al. |
| 5,371,760 | A | 12/1994 | Allen et al. |
| 5,428,999 | A | 7/1995 | Fink |
| 5,431,053 | A | 7/1995 | Fink |
| 5,926,768 | A | 7/1999 | Lewiner et al. |
| 6,128,351 | A | 10/2000 | Jones et al. |
| 6,490,469 | B2 | 12/2002 | Candy |

(Continued)

FOREIGN PATENT DOCUMENTS

| CN | 101098163 A | 1/2008 |
| EP | 1628414 A2 | 2/2006 |

(Continued)

OTHER PUBLICATIONS

P. Gysel, and R. Staubli, "Statistical Properties of Rayleigh Backscattering in Single-Mode Fibers", J. Lightwave Technol., LT-8 (1990), pp. 561-567.

(Continued)

*Primary Examiner* — Kabir A Timory
(74) *Attorney, Agent, or Firm* — Perkins Coie LLP

(57) ABSTRACT

Techniques, apparatuses and systems for providing communications based on time reversal of a channel impulse response of a pulse in a transmission channel between a transmitter and a receiver to enhance reception and detection of a pulse at the receiver against various effects that can adversely affect and complicate the reception and detection of the pulse at the receiver.

29 Claims, 14 Drawing Sheets

(56) References Cited

U.S. PATENT DOCUMENTS

| | | |
|---|---|---|
| 6,834,043 B1 | 12/2004 | Vook et al. |
| 6,980,140 B1 | 12/2005 | Rowland et al. |
| 7,254,171 B2 | 8/2007 | Hudson |
| 7,317,767 B2 | 1/2008 | Happonen et al. |
| 7,324,606 B2 | 1/2008 | Eilts et al. |
| 7,346,280 B1 | 3/2008 | Sguazzotti et al. |
| 7,460,605 B2 | 12/2008 | Candy et al. |
| 7,463,690 B2 | 12/2008 | Candy et al. |
| 7,471,734 B2 | 12/2008 | Thomas et al. |
| 7,496,165 B2 | 2/2009 | Schur et al. |
| 7,519,019 B2 | 4/2009 | Yoon et al. |
| 7,532,692 B2 | 5/2009 | Hwang |
| 7,535,409 B1 | 5/2009 | Choe et al. |
| 7,561,643 B1 | 7/2009 | Piirainen |
| 7,619,964 B2 | 11/2009 | Son et al. |
| 7,653,137 B2 | 1/2010 | Fink et al. |
| 8,027,407 B2 | 9/2011 | Papadopoulos |
| 8,064,507 B1 | 11/2011 | Cheng et al. |
| 8,072,842 B2 | 12/2011 | Dahl et al. |
| 8,121,182 B2 | 2/2012 | Allpress et al. |
| 2001/0038478 A1 | 11/2001 | Hwang |
| 2002/0031104 A1 | 3/2002 | Griffith et al. |
| 2002/0118771 A1* | 8/2002 | Larsson ............ 375/267 |
| 2003/0053413 A1* | 3/2003 | Sawahashi et al. ........... 370/208 |
| 2003/0138053 A1 | 7/2003 | Candy et al. |
| 2004/0013211 A1 | 1/2004 | Lindskog et al. |
| 2004/0014498 A1 | 1/2004 | Grego |
| 2004/0032917 A1 | 2/2004 | Hwang et al. |
| 2004/0059265 A1 | 3/2004 | Candy et al. |
| 2004/0085917 A1 | 5/2004 | Fitton et al. |
| 2004/0156443 A1 | 8/2004 | Dent |
| 2004/0196926 A1 | 10/2004 | Chien et al. |
| 2004/0258356 A1 | 12/2004 | Brice et al. |
| 2005/0013386 A1* | 1/2005 | Ojard ............... 375/316 |
| 2005/0013391 A1 | 1/2005 | Boer et al. |
| 2005/0036787 A1 | 2/2005 | Lee et al. |
| 2005/0047785 A1 | 3/2005 | Hwang et al. |
| 2005/0128966 A1 | 6/2005 | Yee |
| 2005/0159184 A1 | 7/2005 | Kerner et al. |
| 2006/0215539 A1 | 9/2006 | Vrcelj et al. |
| 2006/0245349 A1 | 11/2006 | Vrcelj et al. |
| 2006/0268812 A1 | 11/2006 | Wilson et al. |
| 2007/0218854 A1* | 9/2007 | Lawrence et al. ............. 455/310 |
| 2008/0045864 A1 | 2/2008 | Candy et al. |
| 2008/0159377 A1 | 7/2008 | Allpress et al. |
| 2008/0219334 A1 | 9/2008 | Brainos et al. |
| 2009/0110044 A1 | 4/2009 | Wu et al. |
| 2009/0168739 A1 | 7/2009 | Kim et al. |
| 2009/0285353 A1 | 11/2009 | Ellenbogen et al. |
| 2009/0301198 A1 | 12/2009 | Sohn et al. |
| 2010/0020996 A1 | 1/2010 | Elmedyb et al. |
| 2010/0054322 A1 | 3/2010 | Hui et al. |
| 2010/0067629 A1 | 3/2010 | Gaddam et al. |
| 2010/0085902 A1 | 4/2010 | Phan Huy et al. |
| 2011/0003606 A1 | 1/2011 | Forenza et al. |
| 2011/0286508 A1 | 11/2011 | Smith et al. |
| 2011/0311004 A1 | 12/2011 | Maruta |
| 2012/0032855 A1 | 2/2012 | Reede et al. |

FOREIGN PATENT DOCUMENTS

| | | |
|---|---|---|
| JP | 2001-324654 A | 11/2001 |
| JP | 2006-211308 A | 8/2006 |
| WO | WO-94/18752 A1 | 8/1994 |
| WO | WO-01/10156 A1 | 2/2001 |
| WO | WO-02/05436 A2 | 1/2002 |
| WO | WO-02/23760 A1 | 3/2002 |
| WO | WO-2009/156703 A2 | 12/2009 |
| WO | WO-2009/156705 A2 | 12/2009 |
| WO | WO-2010/042319 A2 | 4/2010 |
| WO | WO-2010/074782 A2 | 7/2010 |
| WO | WO-2011/029072 A2 | 3/2011 |

OTHER PUBLICATIONS

H. Nguyen et al., "Antenna Selection for Time Reversal MIMO UWB Systems" In: Proceedings of IEEE 69th Vehicular Technology Conference, Apr. 26-29, 2009.

\* cited by examiner

TECHNIQUES AND SYSTEMS FOR COMMUNICATIONS BASED ON TIME REVERSAL PRE-CODING

PRIORITY CLAIMS AND RELATED PATENT APPLICATIONS

This patent document claims, under 35 U.S.C. 119(e), the benefits and priorities of the following two U.S. provisional applications filed in U.S.: (1) U.S. Provisional Patent Application No. 61/239,765, filed on Sep. 3, 2009, entitled "TECHNIQUES AND SYSTEMS FOR PROVIDING DATA OVER POWER," and (2) U.S. Provisional Patent Application No. 61/239,761, filed on Sep. 3, 2009, entitled "TECHNIQUES AND SYSTEMS FOR COMMUNICATIONS BASED ON TIME REVERSAL PRE-CODING."

The entire disclosures of the above referenced applications are incorporated by reference as part of this document.

TECHNICAL FIELD

The subject matter described in this document relates to communications, including radio frequency (RF) wireless transceiver devices, and RF communication systems and networks.

BACKGROUND

Radio frequency (RF) wireless communications use wireless transfer of RF waves to communicate and transfer information and can be used in a wide range of applications. For example, RF wireless communications can be used to provide interactive broadband access for data and file transfer, GPS services, web surfing, video capture, streaming video, Internet commerce, Internet gaming, and electronic books. Other examples for applications of RF wireless communications include radar, RF imaging, space communications, RF targeting, RF sensor networks, RF surveillance, and various uses of wirelessly directing RF waves from one location to another. Some specific uses of RF wireless communications are static and mobile RFIDs, inventory tracking and control, and security monitoring at security checkpoints such as airports and shipping ports.

RF wireless signals can be transmitted between two communication nodes through a transmission channel. The transmission channel includes the electronics and antennas of an RF transmitter at the first node. The actual transmission medium is also part of the transmission channel, including various objects which reflect or scatter the wireless RF signals. Also part of the transmission channel are the electronics and antennas of an RF receiver at the second node. Interactions, such as reflecting and scattering, with any encountered objects which are part of the transmission channel can affect the transmission of the wireless RF signal to the RF receiver and the detection of the received wireless RF signal at the RF receiver.

SUMMARY

Techniques, apparatuses and systems are described for providing communications based on time reversal of a channel impulse response of a pulse in a transmission channel between a transmitter and a receiver to enhance reception and detection of a pulse at the receiver against various effects that can adversely affect and complicate the reception and detection of the pulse at the receiver.

In one aspect, a method is provided to include:

detecting at a base a channel impulse response, comprising copies of an impulse-pulse emitted by a remote device, modulated at a first carrier frequency, wherein each copy is received at a different time based on a length of a respective path traveled by the respective copy through a communication channel;

obtaining at the base the channel impulse response modulated at an intermediate frequency by combining the detected channel impulse response modulated at the first carrier frequency with a signal generated at the base and having a first frequency, wherein the intermediate frequency is the difference between the first carrier frequency and the first frequency;

digitizing at the base the obtained channel impulse response modulated at the intermediate frequency into a channel impulse response waveform;

storing at the base the channel impulse response waveform;

reversing in time domain the stored channel impulse response waveform;

preparing a data signal comprising a copy of the time reversed channel impulse response waveform corresponding to each bit of a data stream that comprises information to be provided to the remote target;

modulating the prepared data signal at a transmission frequency; and transmitting the modulated data signal from the base to the remote target.

The method of claim 1, wherein preparing the data signal comprises preparing the data signal so as to provide the transmitted data signal to the remote target as substantially the data stream.

The method as in claim 1 further comprising:

extracting an envelope of the channel impulse response waveform to obtain a waveform of the channel impulse response at base band; and replacing the channel impulse response waveform with the waveform of the channel impulse response at the base band.

In another aspect, a base is provided for providing communications to a remote target, the base comprising:

a receiver to acquire a channel impulse response comprising a set of copies of an impulse-pulse emitted by the remote target, each copy arriving at the base at a different time in accordance to a length of a respective path traveled by the respective copy through a communication channel between the target and the base, wherein the receiver comprises:

- a detector to detect the channel impulse response modulated at a carrier frequency;
- a first oscillator to generate a first local signal at a first frequency;
- a first mixer having a first input coupled to the detector and a second input coupled to the first oscillator, the first mixer to combine the detected channel impulse response modulated at the carrier frequency with the first local signal at the first frequency to obtain the channel impulse response modulated at a first intermediate frequency, wherein the first intermediate frequency is equal to the difference between the carrier frequency and the first frequency; and
- an analog-to-digital converter (ADC) downstream from the first mixer, the ADC configured to digitize the obtained channel impulse modulated at a lowest intermediate frequency into a channel impulse response waveform;

a waveform processor communicatively coupled to the receiver, the waveform processor comprising storage configured to store and reverse in time domain the channel impulse response waveform; and a transmitter configured to emit a data signal, the transmitter comprising:

a multiplexer communicatively coupled to the waveform processor, the multiplexer configured to produce the data signal comprising a copy of the time reversed channel impulse response waveform for each bit of a data stream that comprises information to be provided to the remote target.

In another aspect, a communication method is provided to include:

acquiring at a base, a channel impulse response comprising copies of an impulse-pulse emitted by a remote target, each copy arriving at the base at a different time in accordance to a length of a respective path traveled by the respective copy through a communication, channel between the remote target and the base, wherein acquiring the channel impulse response comprises:

detecting at the base the channel impulse response modulated at a carrier frequency;

obtaining the channel impulse response modulated at an intermediate frequency by combining the detected channel impulse response modulated at the carrier frequency with a signal generated at the base and having a first frequency, wherein the intermediate frequency is the difference between the carrier frequency and the first frequency;

digitizing the obtained channel impulse response modulated at the intermediate frequency into a channel impulse response waveform; and storing the channel impulse response waveform;

transmitting a data stream comprising information from the base to the target, wherein the transmitting comprises:

reversing in time domain the stored channel impulse response waveform;

preparing a data signal comprising a copy of the time reversed channel impulse response waveform corresponding to each bit of the data stream; and emitting the prepared data signal.

In another aspect, a method is provided to include:

detecting at a target, a channel impulse response, h(t), comprising a set of copies of an impulse-pulse, s(t), emitted by a central base, each copy of the impulse pulse s(t) arriving at the target at a different time in accordance to a length of a respective path traveled by the respective copy through a communication channel between the central base and the target;

digitizing the detected channel impulse response h(t) into a channel impulse response waveform, H(t);

storing the channel impulse response waveform, H(t);

reversing in time domain the stored channel impulse response waveform, H(t);

preparing a data signal comprising a copy of the time reversed channel impulse response waveform H(−t) corresponding to each bit of a data stream that comprises information to be provided to the remote target, s(t); and transmitting the prepared data signal from the target to the central base.

In another aspect, an apparatus is provided to include:

a receiver to acquire a channel impulse response, h(t), comprising a set of copies of an impulse-pulse, s(t), emitted by a central base, each copy arriving at the receiver at a different time in accordance to a length of a respective path traveled by the respective copy of the impulse-pulse s(t) through a communication channel between the central base and the receiver, wherein the receiver comprises:

a detector to detect the channel impulse response, h(t); and an analog-to-digital converter (ADC) coupled to the detector to digitize the detected channel impulse h(t) into a channel impulse response waveform H(t);

a waveform processor communicatively coupled to the receiver, the waveform processor comprising storage configured to store and reverse in time domain the channel impulse response waveform H(t); and a transmitter to emit an analog data signal, the transmitter comprising:

a multiplexer communicatively coupled to the waveform processor, the multiplexer configured to produce the data signal comprising a copy of the time reversed channel impulse response waveform H(−t) for each bit of a data stream s(t) that comprises information to be provided to the remote target; and a digital to analog converter to reconvert the data signal to the analog data signal.

In another aspect, a method is provided to include:

emitting an impulse-pulse s(t);

detecting a self-convolved channel impulse response, h(t)*h(t), wherein:

the channel impulse response, h(t), comprises a set of copies of the impulse-pulse s(t), each copy of the impulse-pulse s(t) provided to the remote target at a different time in accordance to a length of a respective path traveled by the respective copy of the impulse-pulse s(t) through a communication channel between the base and the remote target; and the self-convolved channel impulse response, h(t)*h(t), comprises a copy of the channel impulse response h(t) for each copy of the impulse-pulse s(t) included in the channel impulse response h(t) and reflected at the remote target;

reversing in time domain the self-convolved channel impulse response, h(t)*h(t);

transmitting the time reversed self-convolved channel impulse response, h(−t)*h(t), from the base to the remote target; and detecting a data stream, s(t), emitted by the remote target, wherein:

each bit of the detected data stream comprises copies of the impulse-pulse s(t) included in a time reversed channel impulse response, h(−t), received from the remote target for each respective bit, each copy of the impulse-pulse s(t) arriving at the base at the same time; and the time reversed channel impulse response, h(−t), comprises respective copies of the impulse-pulse s(t) formed at the remote target from the copies of the impulse-pulses s(t) included in the transmitted time reversed self-convolved channel impulse response, h(−t)*h(−t) provided to the remote target at respectively the same time.

In another aspect, a method is provided to include:

reflecting a channel impulse response, h(t), comprising a set of copies of an impulse-pulse s(t) received from a central base, each copy of the impulse-pulse s(t) arriving at the target at a different time in accordance to a length of a respective path traveled by the respective copy of the impulse-pulse s(t) through a communication channel between the central base and the target;

detecting a time reversed channel impulse response, h(−t), comprising respective copies of the impulse-pulse s(t) formed at the remote target from the copies of the impulse-pulses s(t) included in the time reversed self-convolved channel impulse response, h(−t)*h(−t) received from the central base arriving at the target at respectively the same time;

digitizing the detected time reversed channel impulse response h(−t) into a time reversed channel impulse response waveform, H(−t);

storing the time reversed channel impulse response waveform, H(−t);

preparing a data signal comprising a copy of the time reversed channel impulse response waveform H(−t) corresponding to each bit of a data stream that comprises information to be provided to the remote target, s(t); and transmitting the prepared data signal from the target to the central base.

In another aspect, a method is provided to include:

detecting a first data stream, s1(t), received from the first remote target;

emitting a copy of a time reversed second channel impulse response h2(−t) for each bit of the detected first data stream s1(t), wherein the second channel impulse response, h2(t), comprises a set of copies of a second impulse-pulse, $\delta_2$(t), emitted by the second remote target, each copy of the impulse-pulse $\delta_2$(t) arriving at the base at a different time in accordance to a length of a respective path traveled by the respective copy of the impulse-pulse $\delta_2$(t) through a second communication channel between the base and the second remote target;

detecting a second data stream, s2(t), received from the second remote target; and emitting a copy of a time reversed first channel impulse response h1(−t) for each bit of the detected second data stream s2(t), wherein the first channel impulse response, h1(t), comprises a set of copies of a first impulse-pulse, $\delta_1$(t), received from the first remote target, each copy of the impulse-pulse $\delta_1$(t) arriving at the base at a different time in accordance to a length of a respective path traveled by the respective copy of the impulse-pulse $\delta_1$(t) through a first communication channel between the base and the first remote target.

In another aspect, a method is provided to include:

detecting a signal comprising a data stream s(t) included with a background signal, wherein:
  a data signal emitted by a central base comprises a copy of a channel impulse response, h(t), for each bit of the data stream, s(t);
  the channel impulse response, h(t), comprises a set of copies of an impulse-pulse s(t) emitted by the target, each copy of the impulse-pulse s(t) arriving at the central base at a different time in accordance to a length of a respective path traveled by the respective copy of the impulse-pulse s(t) through a communication channel between the target and the central base; and
  the background signal having a statistically constant average of each impulse-pulse s(t) and a variance determined by a bit pattern of the data stream s(t) over a number of bits equal to approximately twice the temporal extent of the set of copies of the impulse-pulse s(t) included in the time reversed version of the channel impulse response, h(t) that is retransmitted into the system;

splitting the detected signal into a first and second detected signals;

delaying the second detected signal by a time interval equivalent to the length of a bit; and subtracting the delayed second detected signal from the first detected signal to obtain a differentiated signal free from the statistically constant average of the background signal.

The method of claim 23, further comprising filtering the differentiated signal to recover the data stream s(t) received from the central base, the recovered data stream s(t) free from the statistically constant average of the background signal.

In another aspect, a receiver is provided to include:

a detector to detect a signal comprising a data stream s(t) included with a background signal, wherein:
  a data signal emitted by a central base comprises a copy of a channel impulse response, h(t), for each bit of the data stream, s(t);
  the channel impulse response, h(t), comprises a set of copies of an impulse-pulse s(t) emitted by the target, each copy of the impulse-pulse s(t) provided to the central base at a different time in accordance to a length of a respective path traveled by the respective copy of the impulse-pulse s(t) through a communication channel between the target and the central base; and
  the background signal having a statistically constant average of each impulse-pulse s(t) and a variance determined by a bit pattern of the data stream s(t) over a number of bits equal to twice the size of the set of copies of the impulse-pulse s(t) included in the channel impulse response, h(t);

a splitter coupled with the detector, the splitter configured to split the detected signal into a first and second detected signals;

a delay stage coupled to a first output of the splitter configured to delay the first detected signal by a time interval equivalent to the length of a bit; and a differentiator having a first input coupled to the output of the delay stage and a second input coupled to the second output of the splitter, the differentiator configured to subtract the delayed first detected signal from the second detected signal to obtain a differentiated signal free from the statistically constant average of the background signal.

In another aspect, a base for providing communications to a remote target is provided to include:

a receiver to acquire a channel impulse response comprising a set of copies of an impulse-pulse emitted by the remote target, each copy arriving at the base at a different time in accordance to a length of a respective path traveled by the respective copy through a communication channel between the target and the base, wherein the receiver comprises:
  a detector to detect the channel impulse response modulated at a carrier frequency;
  a first oscillator to generate a first local signal at a first frequency;
  a first mixer having a first input coupled to the detector and a second input coupled to the first oscillator, the first mixer to combine the detected channel impulse response modulated at the carrier frequency with the first local signal at the first frequency to obtain the channel impulse response modulated at a first intermediate frequency, wherein the first intermediate frequency is equal to the difference between the carrier frequency and the first frequency; and
  an analog-to-digital converter (ADC) downstream from the first mixer, the ADC configured to digitize the obtained channel impulse modulated at a lowest intermediate frequency into a channel impulse response waveform;

a waveform processor communicatively coupled to the receiver, the waveform processor comprising storage configured to store and reverse in time domain the channel impulse response waveform; and a transmitter configured to emit an analog data signal modulated at a second carrier frequency, the transmitter comprising:

a multiplexer communicatively coupled to the waveform processor, the multiplexer configured to produce a data signal comprising a copy of the time reversed channel impulse response waveform for each bit of a data stream that comprises information to be provided to the remote target;

an digital-to-analog converter (DAC) downstream from the multiplexer, the DAC configured to convert the produced data signal into the analog data signal;

a second oscillator to generate a second local signal at the second frequency;

a second mixer having a first input coupled to the DAC and a second input coupled to the second oscillator, the second mixer to combine the analog data signal with the second local signal at the second frequency to obtain the analog data signal modulated at a second carrier frequency, wherein the second carrier frequency is equal to the difference between the second frequency and baseband frequency.

In another aspect, a communication system is provided to include:

a target transceiver including a target transmitter that produces a target signal carried by a carrier signal at a carrier frequency, and a target receiver that includes an in-phase carrier oscillator and a quadrature carrier oscillator that operate at the carrier frequency and are out of phase by 90 degrees with respect to each other, an in-phase signal mixer that mixes a received signal with an in-phase carrier oscillator signal from the in-phase carrier oscillator to produce a first signal, a quadrature signal mixer that mixes the received signal with a quadrature carrier oscillator signal from the quadrature carrier oscillator to produce a second signal, and a signal adder that adds the first and second signals to produce a received output signal; and a base transceiver including a base receiver and a base transmitter, wherein the base receiver includes an in-phase local oscillator and a quadrature local oscillator that operate at a local oscillator frequency and are out of phase by 90 degrees with respect to each other, an in-phase signal mixer that mixes a received signal at the base receiver with an in-phase local oscillator signal from the in-phase local oscillator to produce a first signal, a quadrature signal mixer that mixes the received signal with a quadrature local oscillator signal from the quadrature local oscillator to produce a second signal, an in-phase time reversal processor that performs time reversal on the first signal, and a quadrature time reversal processor that performs time reversal on the second signal, and wherein the base transmitter includes a first in-phase signal mixer that mixes the time reversed first signal with a data signal to produce an in-phase data signal, a first quadrature signal mixer that mixes the time reversed second signal with the data signal to produce a quadrature data signal, a second in-phase signal mixer that mixes the in-phase data signal with the in-phase local oscillator signal to produce an in-phase frequency upshifted data signal, a second quadrature signal mixer that mixes quadrature data signal with the quadrature local oscillator signal to produce a quadrature frequency upshifted data signal, and a base transmitter adder that adds the in-phase and quadrature frequency upshifted data signals to produce a base transmission data signal to transmit to the target receiver.

In yet another aspect, a method for communications between a target transceiver and a base transceiver is provided to include:

operating the target transceiver to produce a channel sounding signal to characterize a transmission medium between the target and base transceivers, the channel sounding signal includes an impulse pulse signal modulated onto a carrier at a carrier frequency;

operating the target transceiver to transmit the channel sounding signal through the transmission medium towards the base transceiver;

operating the base transceiver to receive the channel sounding signal as a channel response signal;

operating the base transceiver to split the channel response signal into two copies;

operating the base transceiver to modulate the two copies with in-phase and quadrature oscillators at a local oscillator frequency, respectively, to produce two modulated signals;

operating the base transceiver to filter the two modulated signals to produce in-phase and quadrature channel response signals at a differential frequency between the carrier frequency and the local oscillator frequency;

operating the base transceiver to perform time reversal on the in-phase and quadrature channel response signals to produce time-reversed in-phase and quadrature channel response signals for data transmission to the target transceiver;

operating the base transceiver to modulate a data stream signal d(t) onto the time-reversed in-phase and quadrature channel response signals to produce in-phase and quadrature data signals;

operating the base transceiver to modulate the in-phase and quadrature data signals with the in-phase and quadrature oscillator signals at the local oscillator frequency to upshift the frequency of each of the in-phase and quadrature data signals to the carrier frequency;

operating the base transceiver to add the frequency-shifted in-phase and quadrature data signals to produce a data transmission signal to be transmitted through the transmission medium to the target transceiver;

operating the target transceiver to split the data transmission signal into two copies;

operating the target transceiver to modulate the two copies with in-phase and quadrature oscillators at the carrier frequency, respectively, to produce in-phase and quadrature data transmission signals; and operating the target transceiver to add the in-phase and quadrature data transmission signals together to produce a data signal for extracting the data signal.

The techniques, apparatus and systems described in this document can optionally provide one or more of the following advantages. Based on time reversal of the channel impulse response of a pulse in a transmission channel between a transmitter and a receiver, reception and detection of a pulse at the receiver can be enhanced against various effects that can adversely affect and complicate the reception and detection of the pulse at the receiver.

BRIEF DESCRIPTION OF DRAWINGS

These and other aspects will now be described in detail with reference to the following drawings.

Like reference symbols in the various drawings indicate like elements.

DETAILED DESCRIPTION

Figure 1:
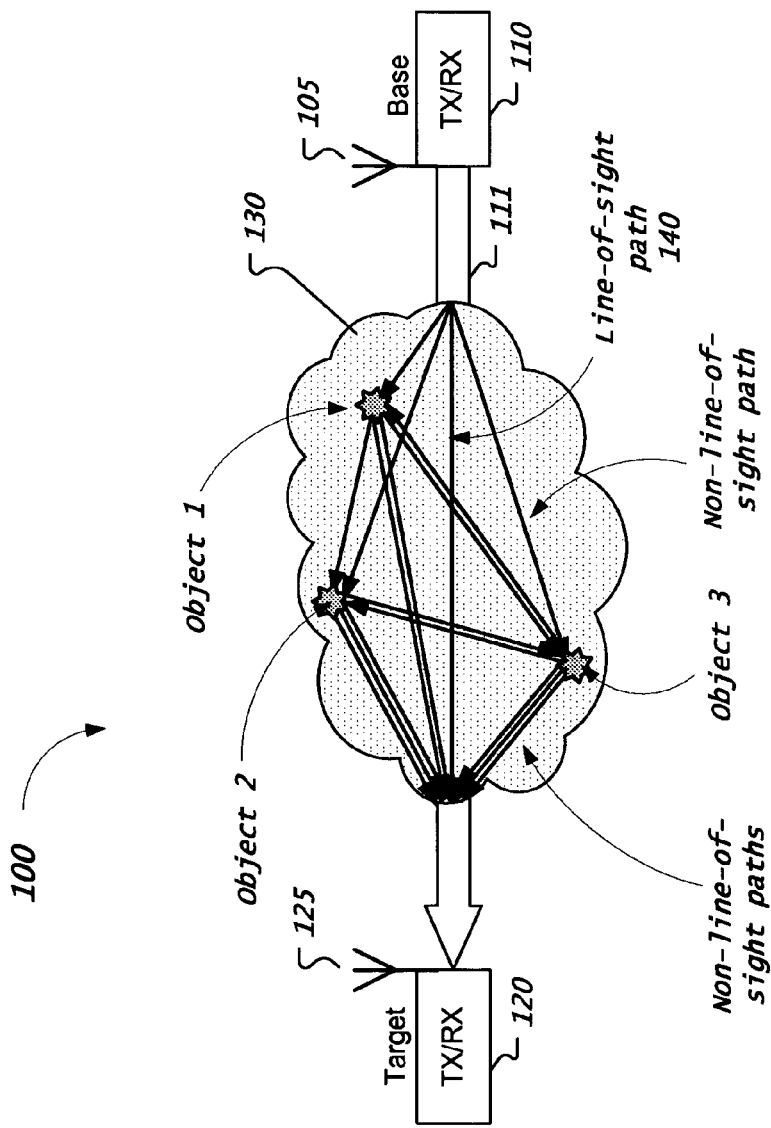
FIG. 1 represents a communications system including a target and a base.

A communication signal in a communication system can be affected by various effects during transmission, such as multipath scattering and reflections in various RF wireless communication systems. These effects can cause the energy of a short pulse or other coded sequence generated at a first location, e.g., a transmitter, to split into different portions along different paths and arrive at a second location, e.g., a receiver, over a period of time longer than the original pulse duration where different portions arrive at the second location at different times.

In an RF communication system, an RF pulse can be emitted from the transmitter's antenna (e.g., an omni-directional antenna) at the first location and received by the receiver's antenna (e.g., an omni-directional antenna) at the second location. A wave representing the pulse can interact with different objects and such interactions cause different portions from the original wave to travel along different paths. The portion of the wave that travels along the line of sight between the transmitter and receiver in a homogeneous medium arrives at the second location before arrival of other portions of the wave. The other portions of the wave are detected by the receiver at the second location after these other portions of the wave are scattered or reflected towards the second location by various objects in the transmission channel. Such other portions of the wave may have different signal strengths, different polarization, modified pulse shapes and different delays relative to the portion of the wave that arrives at the receiver along the line of sight between the transmitter and receiver.

Delays can also result from the different frequency components of a signal taking different amounts of time to propagate between terminals of the antenna and different physical locations on the antenna. These delays are referred to as dispersion to distinguish them from multipath delays.

The foregoing multipath transmission can be described alternatively as a process where the pulse emitted by the transmitter at the first location is effectively broken into a set of copies of itself that travel along their respective paths, each copy being delayed by some time due to the respective total length of its own respective path before arriving at the receiver. The number of copies arriving at the receiver corresponds to the number of paths that (i) connect the first location with the second location, and that (ii) pass through zero, one or more scattering or reflecting centers in the transmission channel. Each copy of the pulse emitted at the first location arrives at the second location at a different time in accordance to a length of a respective multi scattering path traveled by the respective copy of the emitted pulse through the transmission channel between the transmitter and the receiver. The delayed pulses arriving at the second location may not be exact copies of the original pulse leaving the first location. A channel impulse response h(t), defined as a waveform including the forgoing set of pulse copies, uniquely characterizes the communication channel between the first and second locations.

Techniques, apparatus and systems are described to detect and process the channel impulse response h(t) of a communication system. Once detected and appropriately processed, the channel impulse response h(t) can be used to implement methods based on time reversal for communication of information through a communication channel. Such time reversal communication methods can be performed to communicate the information with high fidelity and strong immunity against multipath and other adverse effects on transmission of information and thus reduce the reliance of, or eliminate the need for, complex filtering or complex data signal processing at the receiving end.

For example, the waveform detected at the second location for the short pulse transmitted from the first location, can be returned through the transmission channel to arrive back at the first location as a short pulse. A transmitter at the second location emits the trailing portions of the detected wave first, while the leading portions of the wave are emitted last. Due to the time reversal properties of wave propagation, only the respective portions of the wave which travel through the transmission channel along the original paths can arrive in phase at the first location. Moreover, because the return paths of the time reversed portions of the wave from the second location to the first location coincide with the forward paths along which the original portions of the wave travel from the first location to the second location, these portions of the waveform emitted from the second location arrive at the first location and overlap with one another in time after applying the delays associated with the time reversal process. Therefore, the transmitter at the second location emits a time reversed signal and effectively produces a pulse that and is spatially and temporally focused towards the first location. The wave that is received and detected by a receiver at the first location is essentially a replica of the original pulse but travels in the opposite direction.

In this context, the focusing of the pulse in the time domain includes shortening the time duration of a portion of the signal emitted from the second location to the time duration of the pulse emitted originally from the first location by an antenna such as an omni directional antenna. The spatial focusing of the time reversed pulse includes emitting the wave from the second location and concentrating a portion of the wave energy at the first location. The spatial focusing is effectuated by time reversed emission creating identical conditions as a directional antenna array for beam shaping but without relying on beam shaping elements specific to a directional antenna array.

If the transmitter at the second location emits the time reversed signal repeatedly, a sequence of pulses can be detected at the first location. Therefore, time reversal of waves can be used to establish communications between the transmitter at the second location and the receiver at the first location. The transmitter at the second location focuses each pulse of a data sequence or bit stream at the first location using time reversal emission, thus compensating for noise due to scattering, multipath and dispersive effects. An identical process can be applied to transmit data in the reverse direction.

The techniques, apparatus and systems described in this document apply the time reversal of the channel impulse response of the transmission channel to communications to mitigate various effects adversely affecting the signal transmission in the presence of multipath scattering.

Effect of Channel Impulse Response on Data Transmission

FIG. 1 illustrates an example of a communication system 100 that is subject to multipath scattering or reflections in the transmission medium 130. The base 110 and the target 120 associated with the communication system 100 in FIG. 1 are RF transceivers and each equipped with a transmitter (TX), a receiver (RX) and a suitable antenna (e.g., an omnidirectional antenna). The target omnidirectional antenna 125 can be different from the base omnidirectional antenna 105. The base 110 transmits a data encoded signal 111 to the target 120 via the transmission medium 130. The terms data encoded signal and signal are used interchangeably in the following description. The signal 111 transmitted from the base 110 to the target 120 undergoes scattering from various objects on the line-of-sight and non-line-of-sight paths.

The signal received at the target 120 includes multiple portions that are generated from the original pulse, such as interference contributions due to, for example, multipath scattering, reflections and dispersion delays. Thus, the signal received at the target 120 has a time duration longer than that of the signal 111 provided at the base 110. The signal 111 emitted by the transmitter at the base 110 is denoted s(t). The signal detected by the receiver at the target 120 is denoted q(t), and includes two contributions:

$$q(t)=s(t)*h(t)+n(t) \quad (1)$$

The first term in EQ. 1 corresponds to the convolution between the signal s(t) and the channel impulse response h(t) of the transmission channel. The second term n(t) represents random noise. Random noise can be caused by, for example, a detection or measurement error or signals that reach target antenna 125 but do not originate from base 110. Therefore, the random noise term n(t) in EQ. 1 usually tends to be independent of the transmission path.

The transmission channel includes the entire medium 130 between the base 110 and the target 120, including, e.g., areas out of the line of sight path 140 from the base 110 to the target 120. The channel impulse response h(t) depends on the characteristics of the transmission channel, such as the number of scattering or reflecting objects, their placement and orientation with respect to the line of sight from the base 110 to the target 120. The characteristics of the transmission channel can influence the channel impulse response. In FIG. 1, three scattering or reflecting centers or objects are depicted as examples. Different scattering or reflecting centers cause different scattering or reflecting paths, and the different arrival times of these different paths may lengthen the time duration of the channel impulse response h(t) and implicitly of the received signal q(t).

Scattering or reflecting objects placed away from the line of sight path 140 as illustrated in FIG. 1 cause longer scattering or reflecting non-line-of-sight paths, which lead to lengthening the time duration of h(t) and q(t). Fifteen non-line-of-sight paths are depicted in FIG. 1 as examples in addition to the line-of-sight path 140. Alternatively, if the transmission medium 130 does not contain scattering or reflecting centers and the electronics is optimized, then the channel impulse response due to the path can be close to unity, h(t)=1, when suitably normalized and the signal q(t) received at the target 120 resembles very well the signal s(t) 111 emitted at the base 110. In the absence of scattering or reflecting objects and events and under the above circumstance, the signal detected by the receiver at the target 120 does not have a longer time duration than the signal 111 emitted by the base 110.

In the communication system 100 the transmitter at the base 110 may not have any knowledge of the channel impulse response prior to transmitting signals from the base 110 to the target 120. Therefore, the discrimination and equalization processes needed to extract data from the transmitted signal 111 are performed by the receiver at the target 120. From the perspective of the target 120, both the channel impulse response h(t) and the random noise n(t) represent random processes and are difficult to separately account for.

Time Reversal of Channel Impulse Response

In the exemplary system in FIG. 1, the effects on signal propagation by multipath scattering or reflections in the transmission channel in the medium 130 can be corrected by proper time reversal. A pulse (e.g., an impulse-pulse) submitted from the target 120 is detected by the base 110 after propagation through the transmission channel. The detected pulse experiences the effect of the transmission channel and thus contains information on the characteristics of the transmission channel. Based on the detected pulse, the base 110 can obtain the characteristics or the response of the medium to the propagation of an impulse. The waveform detected by the base 110 is the channel impulse response h(t) characteristic to the transmission channel 130. Assuming T represents a time delay to preserve causality of the signal, when the time reversed channel impulse response h(T−t) is reemitted by the base 110, the pulse arriving back at the target 120 is approximately the original impulse pulse. This time reversed channel impulse response matches and negates the effects of the multipath scattering or reflecting in the propagation medium 130. The convolution between the channel impulse response h(t) and the time reversed channel impulse response h(T−t) is given approximately by the impulse (delta) function:

$$h(t)*h(-t)=\delta(t) \quad (2)$$

The signal s(t) 111 is generated by the transmitter at the base 110. If instead of emitting the signal s(t) 111, the base 110 emits a signal containing the convolution s(t)*h(T−t), then the signal received at the target 120 is given approximately by $$q(t)=[s(t)*h(-t)]*h(t)+n(t)$$

$$q(t)=s(t)*[h(-t)*h(t)]+n(t)=s(t)*\delta(t) \quad (3)$$

As suggested by EQs. 2-3, the signal q(t) detected at the target 120 has been filtered by the transmission channel 130 itself. The signal emitted at the base 110 now contains the time reversed channel impulse response h(T−t), where T represents a time delay to preserve causality of the signal. The time delay T is related to the time it takes the base 110 to receive and reverse in the time domain the signal corresponding to the channel impulse response h(t). As discussed above, the effect of the time reversed channel impulse response h(T−t) is to match and negate the contribution of the channel impulse response h(t). Thus, the effect of the multipath scattering in the transmission channel 130 is cancelled and the signal detected by the receiver at the target 120 is a close replica of the signal s(t) 111 included in the signal emitted by the transmitter at the base 110. It is noted that the result h(t)*h(−t)=s(t) is an approximation and a more accurate representation is h(t)*h(−t)=s(t)+Σ(a_i s(t+Δt_i)) where the term Σ(s(t+Δt_i)) represents other copies of the impulse function s(t) whose time delays are not correctly equalized. In various practical systems, these additional components have much smaller amplitudes $a_i$ than the dominant signal s(t) and hence their effects can be ignored. Hence the final signal at the target 120 appears like a large single impulse with a much smaller extended background.

It is also to be understood that in practical implementations of the system in FIG. 1, the returning impulse function s(t), although its constituent components may be correctly realigned in the time domain, may not be identical in shape to the original outgoing impulse s(t) due to effects resulting from transmission of a signal through an antenna or other electronic components. Since such effects depend on the exact details of the antenna, and can be corrected by signal filtering or processing in post processing electronics, our subsequent discussion will assume that all similar effects have been properly corrected and do not affect the substance or basic operations of the techniques, devices and systems described herein.

Prior to establishing a data transmission based on time reversal, the time reversed channel impulse response h(T−t) of the transmission channel 130 is measured. Subsequently, the data transmission process can be implemented according to EQ. 3.

Acquisition and Time Reversal of Channel Impulse Response

Figure 2:
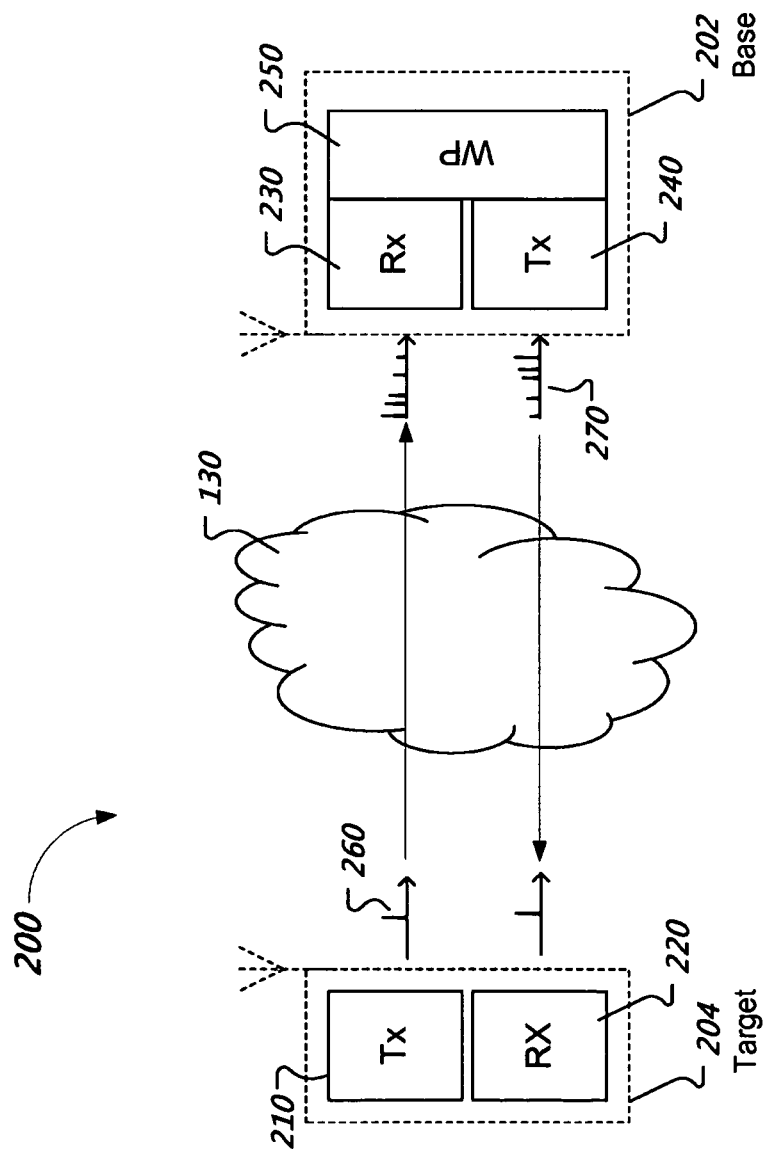
FIG. 2 represents another communications system including a target and a base.

FIG. 2 shows an example of an implementation 200 of the communication system based on time reversal in FIG. 1. The communication system 200 can be configured to include circuit elements and devices that detect, digitize and store the channel impulse response h(t). In real physical systems, it is not possible to separate the channel impulse response h(t) from an actual physical signal s(t)*h(t) since this would require an infinitely narrow pulse s(t). Hence in this document, when we refer to devices capturing, measuring, digitizing, detecting, transmitting, storing or any other physical operation on the channel impulse response h(t) or h(T−t), it is to be understood that the actual physical signal that we deal with is s(t)*h(t) or its time reversed version s(T−t)*h(T−t). Hence it is more technically accurate to refer to the channel pulse response. However, for convenience, we will often simply refer to this as h(t) or h(T−t) and refer to it as the channel impulse response. This is acceptable since the time reversal effects that we discuss in this document are only relevant to the h(t) component and not the s(t). An analog-to-digital converter (ADC) is provided to digitize the detected channel impulse response h(t) into a channel impulse response waveform. The system 200 includes a base 202 and a target 204 which exchange signals through a transmission channel via the medium 130. The terms "base" and "target" are used in this document to denote wireless communication devices, base stations or nodes that may be fixed in location or may be mobile. The base and target may be configured to include various communication and signal processing functions and may be transmitter, receivers or transceivers. In some implementations, the "base" and "target" are used interchangeably. In some implementations, a base or base station may be a centrally located in a communication system or network and is configured to include various communication and signal processing functions while a "target" may have less functionality than the base station but may be more mobile under some circumstances.

The target 204 is equipped, among other things, with a target-TX 210, a target-RX 220 and an antenna 125. The antenna may be an omnidirectional antenna, but other suitable antenna types can be used. The target-TX 210 emits an impulse pulse 260, which can be a delta pulse, or another pulse shape that allows the different paths from the target 204 to the base 202 via different scatterers or reflectors to be uniquely resolved in the channel impulse response h(t). This impulse pulse 260 (also referred to as channel mapping impulse, or simply probe pulse) passes through the medium 130, interacting with scattering and multipath elements and arrives at the base 202. In some implementations, the probe pulse can have a predetermined shape, e.g., a delta pulse, a Gaussian pulse, etc. In other implementations, the probe signal can include a sequence of a predetermined number of pulses where each pulse has an associated shape and is separated by associated predetermined time intervals.

The base 202 includes a receiver base-RX 230, a transmitter base-TX 240, an antenna 105 and a waveform processing unit 250 (WP). The antenna may be an omnidirectional antenna, but other antenna types can be used. A set of copies of the emitted pulse 260 from the target 204 and detected by the base-RX 230 defines the channel impulse response h(t) of the transmission channel 130.

The base-RX 230 includes an analog-to-digital converter (ADC) coupled to the antenna which digitizes the channel impulse response h(t) in a high speed sampling circuit with the waveform processor 250. The waveform processor 250 stores the channel impulse response waveform h(t) in a memory unit. The waveform processor 250 then reverses in time domain the channel impulse response waveform h(t) to generate a time reversed channel impulse response waveform h(T−t) 270. In some implementations, in addition to the channel impulse response waveform h(t), the time reversed channel impulse response waveform h(T−t) may also be stored in the waveform processing unit 250. In yet another implementation, only the time reversed channel impulse response waveform h(T−t) 270 is stored in the waveform processing unit 250, and not the channel impulse response waveform h(t). In one aspect, the waveform processing unit 250 stores the channel impulse response waveform h(t) in a last-in-first-out (LIFO) buffer. Therefore, the time reversal step is built in as a property of the LIFO buffer: The channel impulse response waveform h(t) goes into the LIFO buffer for storage, and, the time reversed channel impulse response waveform h(T−t) 270 comes out of the LIFO buffer upon accessing the buffer.

Upon receiving the signal from the target 204, the base-TX 240 can emit the stored time reversed channel impulse response h(T−t) 270. When for example the medium is linear and reciprocal, the signal emitted at the base 202, which includes the time reversed channel impulse response h(T−t) 270, arrives at the target 204 with all transmission delays removed, as shown in EQ. 2. The target-RX 220 detects a pulse that resembles the original impulse pulse 260. As discussed regarding EQ. 2, the original temporal shape of the pulse 260 is preserved upon return to the target 204.

In some implementations of the communication system 200, the target-TX 210 and the base-TX 240 are configured to emit analog signals, while the base-RX 230 is configured to receive analog signals. In contrast the target-RX 220 can be configured to receive digital signals. In another exemplary implementation of the communication system 200, the target-RX 220 can be configured to receive analog signals.

In some implementations of the communication system 200 the target-TX 210 and the base-TX 240 are configured to emit digital signals, while the base-RX 230 and the target-RX 220 are configured to receive digital signals.

In another aspect, impulse (or probe) signals can also be transmitted by the base station 202 and data signals can also be transmitted by the target 204. Such a configuration enables impulse and data signal flow in both directions, as described with respect to examples in FIGS. 4-6 below.

Temporal focus and spatial focus are obtained for the communications system 200. The pulse 260 emitted by the target 204 as a wave is reflected or sent back by the base 202 after time reversal operation at the base 202. The reflected and time reversed pulse returns precisely at the target 204 location, because only at the target 204 location the portions of the wave scattered or reflected within the transmission channel 130 can add up in phase, both spatially and temporally.

Data Transmission from Base to Target

In the exemplary system in FIG. 2, once the channel impulse response h(t) of the transmission channel through the medium 130 is determined and the time reversed channel impulse response waveform h(T−t) is stored by the base 202, the characterization process of the transmission channel through the medium 130 is completed. Based on the stored time reversed channel impulse response waveform h(T−t) at the base 202, the communication system 200 can be configured and operated for data transmission with high transmission fidelity. In this implementation, a data channel is integrated into the base-TX 240 of the communication system 200.

Figure 3:
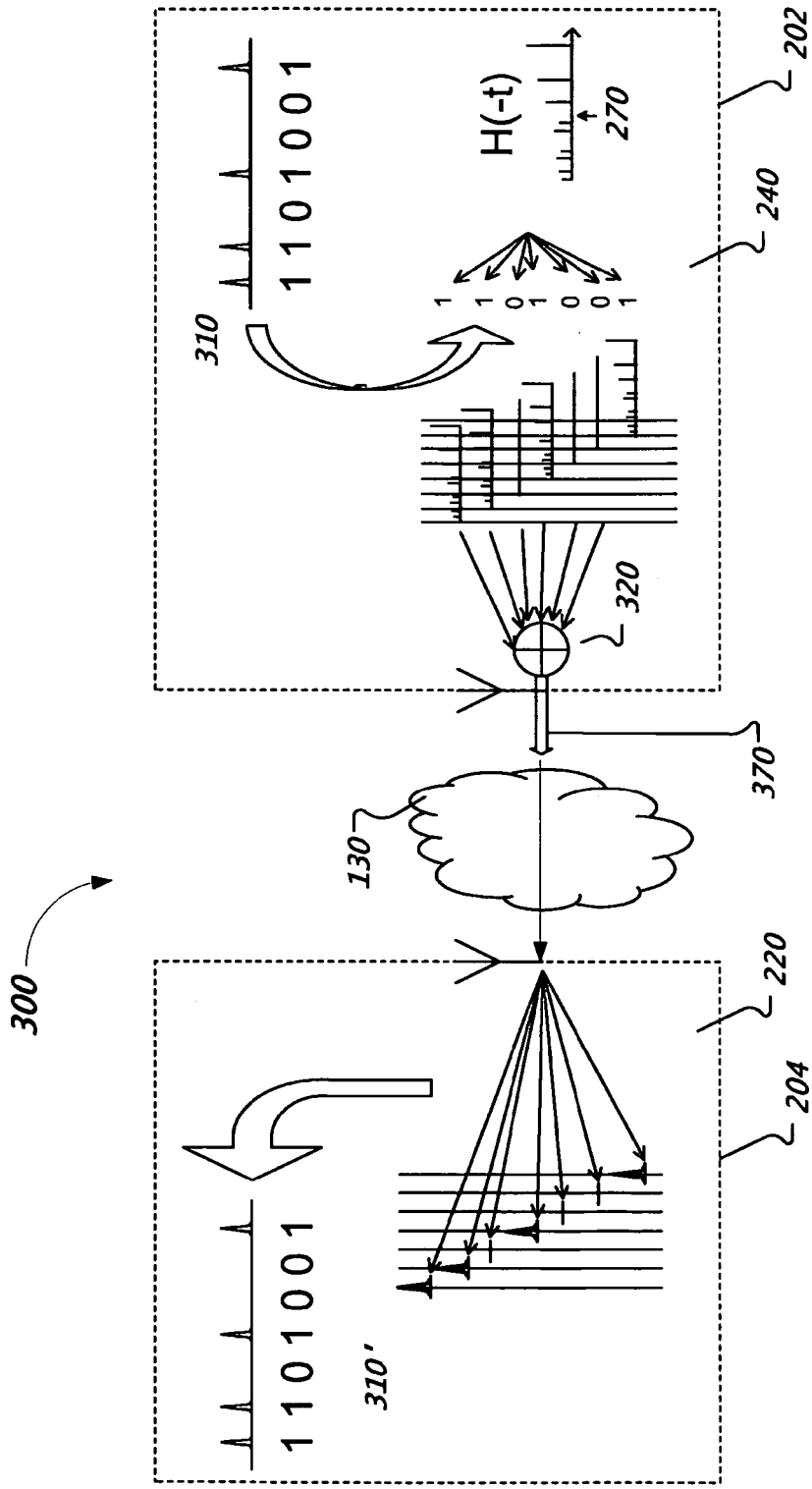
FIG. 3 is a schematic illustrating data transmission between a base and a target.

FIG. 3 depicts a procedure to integrate the time reversed channel impulse response waveform h(T−t) 270 into the data channel. A data stream d(t) 310 of sequential RF pulses can be sent from the base 202 to the target 204. In the illustrated example, the data stream d(t) 310 represents a digit sequence of 1101001. The data stream d(t) 310 destined for the target 204 is convolved with the time reversed channel impulse response h(T−t) 270. The time reversed channel impulse response h(T−t) 270 has been stored at the base 202 inside the waveform processing unit 250. The base-TX 240 transmits a copy of the time reversed channel impulse response h(T−t) 270 for each data bit, as shown in FIG. 3. In an exemplary implementation, a one-bit signal can be encoded and generated by emission of a copy of the time reversed channel impulse response h(T−t) 270 and a zero-bit signal can be generated when no copy of time reversed channel impulse response h(T−t) 270 at all is sent back, such that there are no waves to align when a zero returns to the target 204. In another implementation, a zero bit is encoded by emission of a modified copy of the time reversed channel impulse response h(T−t) 270.

Furthermore, ones and zeroes can be coded by different amplitude assignments. Ones and zeroes can also be coded by time, frequency, phase or scale modulation.

The temporal length of a bit can have various lengths, depending on the nature of the communications application. For example, for radio frequency (RF) data rates on the order of one gigabit per second, each bit may be on the order of 1 ns in the time domain. The temporal length of the channel impulse response h(t) for an RF wireless communications system characterized by multipath scattering or reflections varies depending on the configuration of the physical environment. For example, the time duration of h(t) can be on the order of 200 ns or more in some system implementations. The sampling frequency for the base and target may be two times the maximum frequency of the pulse response s(t)*h(t). For a 1-nsec impulse and a 1000-nsec channel impulse response h(t), the sampling frequency would typically be set at 2 GS/s resulting in a total of 2000 samples. The base-TX 240 can transmit all or part of the time reversed channel impulse response h(T−t) 270. In certain implementations, the base-TX 240 can modify the time reversed channel impulse response h(T−t) 270, by using digital signal processing (DSP) techniques, prior to transmission to the target 204.

Copies of time reversed channel impulse response h(T−t) 270 are time-multiplexed 320 in a prepared data stream signal based on an appropriate bit boundary synchronization, as illustrated in FIG. 3. Because the time reversed channel impulse response h(T−t) 270 is longer than the time between bits, the multiple delayed copies of the time reversed channel impulse response h(T−t) 270 are added before the transmission. In one implementation, the summation is performed digitally before the signal reaches analog circuitry of the base-TX 240. In another implementation, the summation is performed by analog circuitry of the base-TX 240.

The data stream signal starts at the base 202 as an output signal 370, prepared as described above, traverses the multipath transmission channel 130 and arrives at the target 204 as a stream of bits 310' corresponding to s(t), for example, 1101001. The respective copy of time reversed channel impulse response h(T−t) 270 corresponding to each bit at the base 202 has been matched and filtered during propagation through the medium 130 from the base 202 to the target 204, as described by EQs. 2 and 3. The target-RX 220 detects the data stream signal s(t) 310', free of the inter-symbol interference caused by the multipath transmission channel 130.

Figure 4:
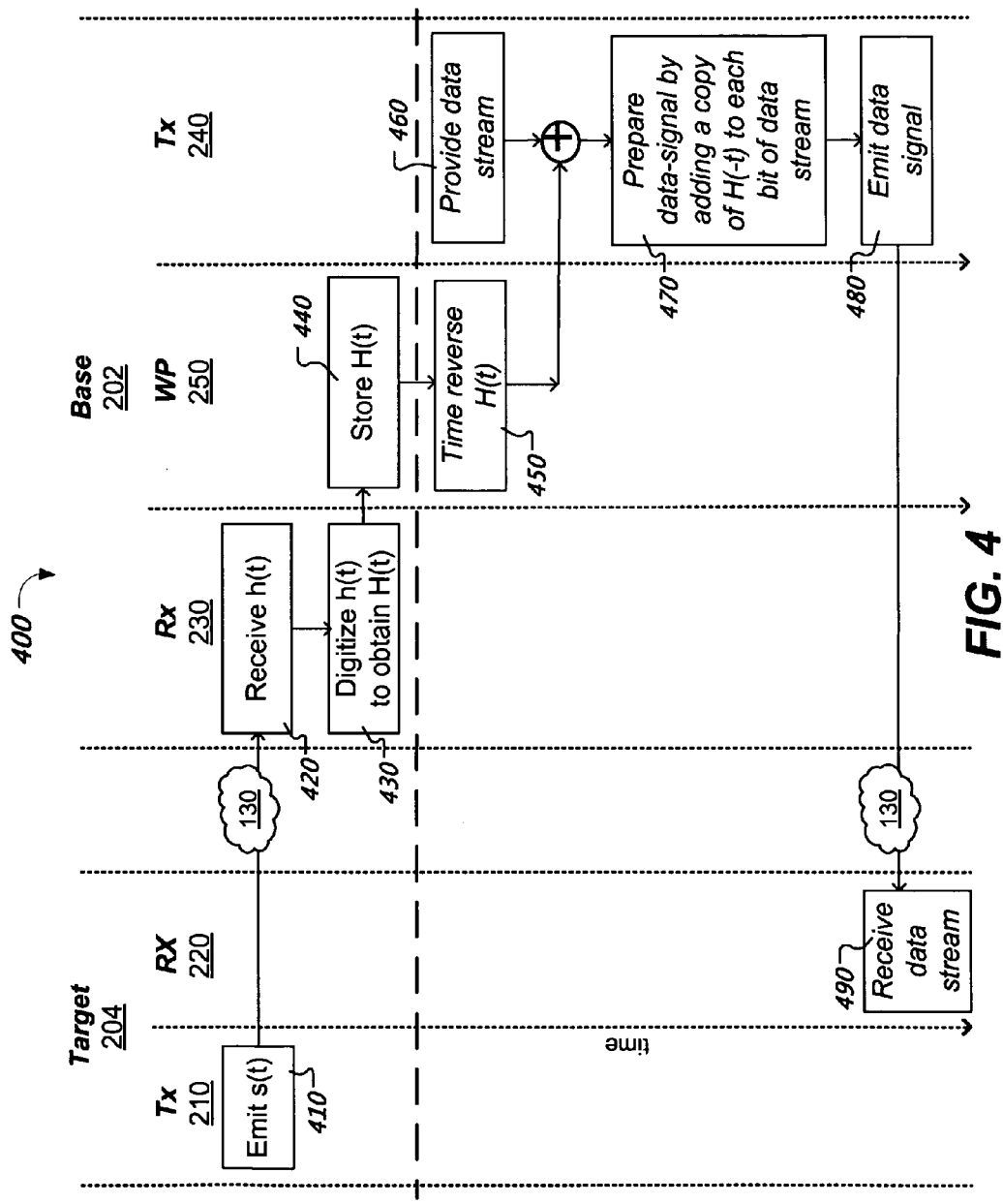
FIG. 4 is a method for data transmission between a base and a target.

FIG. 4 is a swim-lane diagram 400 illustrating a communication technique based on time-reversal with respect to FIGS. 2 and 3. The method 400 is depicted as a time sequence, with method steps performed earlier in time disposed at the top of diagram 400, and respectively method steps performed later in time disposed at the bottom of diagram 400.

The first or left-most (vertical) lane signifies the time sequence corresponding to the target-TX 210. The second lane corresponds to the time sequence of the target-RX 220. Thus, the first and second lanes depict method steps performed at the target 204 location.

The third lane represents the communication channel 130. Notably, signals are being transmitted through the communication channel, for example between steps 410 and 420, or between steps 480 and 490.

The fourth lane illustrates the time sequence of the base-Rx 230. The fifth lane corresponds to the time sequence of the base waveform-processor 250. The sixth or right-most lane represents the time sequence of the base-Tx 240. Thus, the fourth through sixth lanes depict method steps performed at the base 202 location.

At step 410, the target-Tx emits an impulse-pulse, s(t), using an omnidirectional antenna or another suitable antenna.

At step 420, the base-Rx 230 receives the channel impulse response, h(t), defined as a set of copies of the impulse-pulse, s(t), each copy of the impulse-pulse, s(t), emitted by the target-Tx 210 arriving at the base-Rx 230 at a different time in accordance to a length of a respective multi scattering path traveled by the respective copy of the impulse-pulse, s(t), through the transmission channel between the target and the base.

At step 430, the base-Rx digitizes the received channel impulse response, h(t), to obtain a channel impulse response waveform, H(t). An analog-to-digital converter (ADC, or simply digitizer) may be used to perform step 430. Intermediate steps between receiving the channel impulse response h(t) at step 420, and obtaining the channel impulse response waveform H(t) at step 430, will be described in a later section of this application, in reference to FIGS. 8-10. The channel impulse response waveform H(t) obtained at step 430 includes a set of digital samples as described above in reference to FIG. 2.

At step 440, the channel impulse response waveform H(t) is stored by the base waveform-processor 250. Several storage implementations have been described with respect to FIG. 2.

Returning to FIG. 4, the horizontal dashed-line succeeding step 440 represents a delineation between method steps related to obtaining the channel impulse response h(t) of the communication channel between the target and the base (as illustrated in FIG. 2), and method steps related to using the obtained channel impulse response h(t) to pre-code data streams for transmission from the base to the target (as illustrated in FIG. 3).

At step 450, the stored channel impulse response waveform H(t) is reversed in time domain. For example, to obtain the time reversed channel impulse response waveform H(−t), the channel impulse response waveform H(t) can be simply read and sorted in the reverse temporal order.

At step 460, a data stream is provided at the base-Tx for transmission to the target 204. The data stream can be generated locally at the base and can include instructions destined for the target. The data stream can also arrive at the base (if the base functions as a gateway) from the internet, and be destined for the target.

At step 470, the base-TX prepares a data-signal which includes a copy of the time reversed channel impulse response waveform H(−t) for each bit of the data stream. For example, if the data stream provided at step 460 is given by the bit-sequence d(t)=[1101001], then the data-signal prepared at step 470 is $$s(t)=H(-t)+H(-t+\Delta t)+H(-t+3 \tag{4}$$

In Eq. (4), Δt (e.g., 1 ns) represents the time duration of a bit of the data stream d(t). In this exemplary implementation of method 400, a copy of H(−t) is included in the data-signal for each 1-bit, and no copy of H(−t) is included for each 0-bit.

Therefore, the first term in Eq. (4) corresponds to the first bit in d(t). The second term in Eq. (4), H(−t+Δt), corresponds to the second bit in d(t), delayed from the first bit by Δt. The third term in Eq. (4), H(−t+3Δt), corresponds to the fourth bit in d(t), delayed from the first bit by 3Δt. And, the fourth term in Eq. (4), H(−t+6Δt), corresponds to the seventh bit in d(t), delayed from the first bit by 6Δt.

In step 480, the prepared and pre-coded data-signal is emitted by the base-TX 240 to the target 490. According to the data-signal preparation step discussed in reference to Eq. (4), H(−t) can be substituted, for example, with the time reversed channel impulse response waveform H(−t) 270 illustrated in FIG. 3. Specifically, H(−t) 270 includes 9 copies of the impulse-pulse 260, s(t), emitted by the target-Tx 210. Therefore, the emitted signal (prepared data-signal) S(t) contains 36 copies of the impulse-pulse 260, s(t), delayed in time in accordance to Eq. (4).

In step 490, the target-RX 220 receives the data stream d(t), provided earlier by the base 202, at step 460. Referring again to the exemplary data signal prepared according to Eq. (4), where H(−t) 270 is given in FIG. 3, the 9 copies of H(−t) 270 (corresponding to the first term in Eq. (4)) converge at the target-RX 220 simultaneously, to form one pulse corresponding to a 1-bit, as the first bit of a detected data stream: d'(t)= [1]. The next 9 copies of H(−t+Δt) 270 (corresponding to the second term in Eq. (4)) converge at the target-RX 220 simultaneously, delayed by a time interval Δt relative to the first pulse, to form one pulse corresponding to the next 1-bit, as the second bit of the detected data stream: d'(t+Δt)=[11]. The next 9 copies of H(−t+3Δt) 270 (corresponding to the third term in Eq. (4)) converge at the target-RX 220 simultaneously, delayed by a time interval 3Δt relative to the first pulse, to form one pulse corresponding to the next 1-bit, as the fourth bit of the detected data stream: d'(t+3Δt)=[1101]. And, the next 9 copies of H(−t+6Δt) 270 corresponding to the fourth term in Eq. (4) converge at the target-RX 220 simultaneously, delayed by a time interval 6Δt relative to the first pulse, to form one pulse corresponding to the next 1-bit, as the seventh (and last) bit of the detected data stream: d'(t+6Δt)= [1101001].

Therefore, method steps 450 to 490 enable transmission of a data stream d(t) provided at a base and destined for a target, by pre-coding each bit of the data stream with a copy of the time reversed channel impulse response waveform H(−t), corresponding to the transmission channel between the target and the base.

Data Transmission from Target to Base

The techniques for data transmission from a base to a target described in reference to FIGS. 2-4 can be implemented in the reverse direction to transmit data from the base to the target, also based on time reversal. Data transmission from the target to the base in conjunction with data transmission from the base to the target enables full duplex communications based on time reversal between the target and the base.

Figure 5:
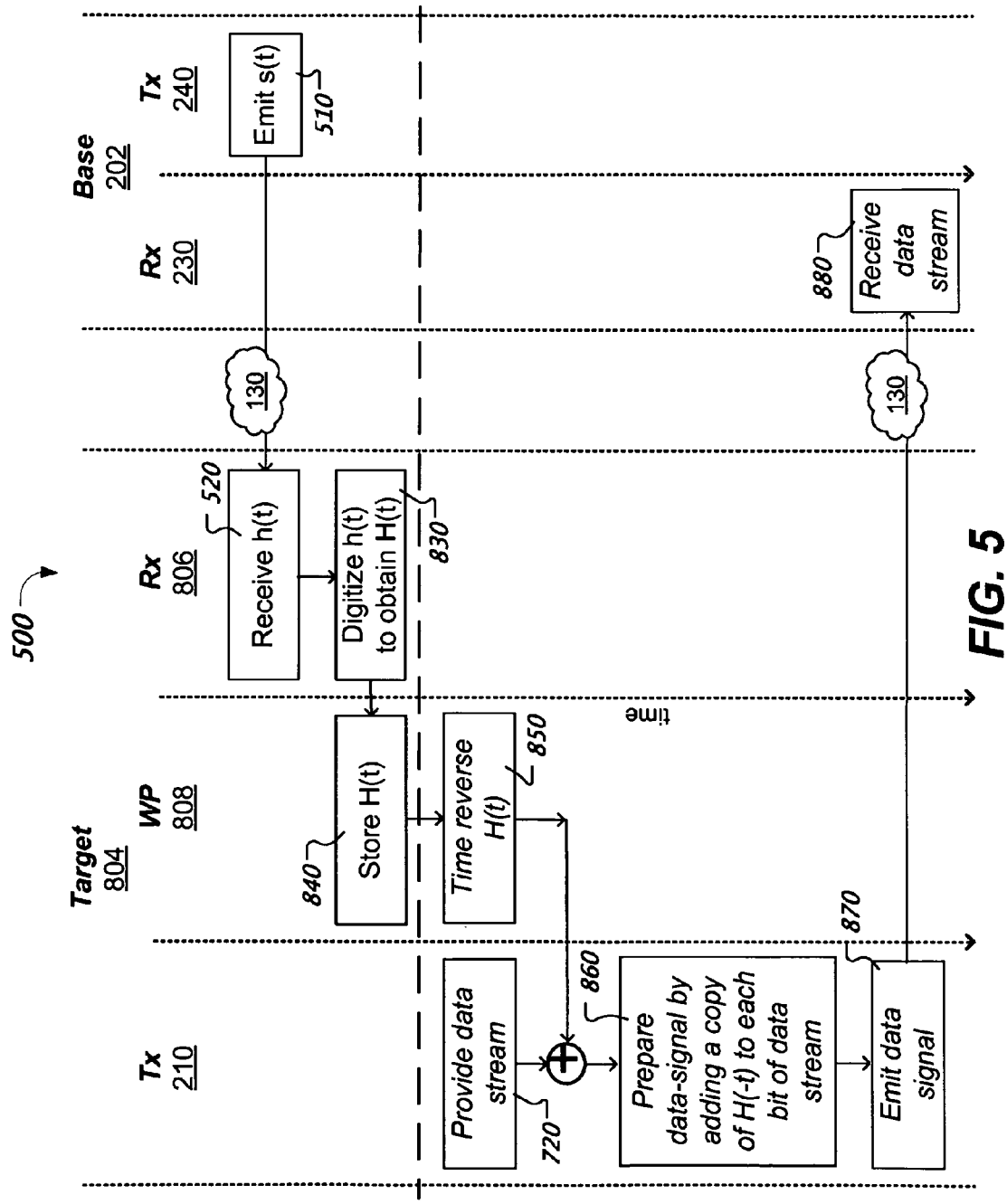
FIG. 5 is a method for data transmission between a target and a base.

FIG. 5 illustrates an example of data transmission from the base to the target based on time reversal in the system in FIG. 2. In this example, a target 804 is configured to transmit data to the base 202. The target 804 includes a target-Rx 806 configured to digitize a detected channel impulse response h(t) into a channel impulse response waveform H(t). The target 804 also includes a target waveform processor 808 configured to store and reverse in the time domain the channel impulse response waveform H(t). Such target 804 is capable to perform the method described in reference to FIGS. 2-4, and additionally, is configured to perform the communication method described below.

The swim-lane diagram 500 in FIG. 5 illustrates the operations performed by the base and the target for data transmission from a target 804 to a base 202 based on time reversal. The method 500 is depicted as a time sequence, with method steps performed earlier in time disposed at the top of diagram 500, and respectively method steps performed later in time disposed at the bottom of diagram 500.

The first or left-most (vertical) lane signifies the time sequence corresponding to the target-TX 210. The second lane corresponds to the time sequence of the target waveform-processor 808. The third lane corresponds to the time sequence of the target-Rx 806. Thus, the first through third lanes depict method steps performed at the target 804 location.

The fourth lane represents the communication channel 130. Notably, signals are being transmitted through the communication channel, for example between steps 510 and 520, or between steps 870 and 880.

The fifth lane illustrates the time sequence of the base-Rx 230. The sixth or right-most lane represents the time sequence of the base-Tx 240. Thus, the fifth and sixth lanes depict method steps performed at the base 202 location.

At step 510, the base-Tx 240 emits an impulse-pulse, s(t), using an omnidirectional antenna.

At step 520, the target-Rx 806 receives the channel impulse response, h(t), defined again as a set of copies of the impulse-pulse, s(t), each copy of the impulse-pulse, s(t), emitted by the base-Tx 240 arriving at the base-Rx 806 at a different time in accordance to a length of a respective multi scattering path traveled by the respective copy of the impulse-pulse, s(t), through the transmission channel between the base and the target.

At step 830, the target-Rx digitizes the received channel impulse response, h(t), to obtain a channel impulse response waveform, H(t). The channel impulse response waveform H(t) obtained at step 830 includes a set of digital samples, as described above with respect to FIG. 2.

At step 840, the channel impulse response waveform H(t) is stored by the target waveform-processor 808. Several storage implementations have been described with respect to the base storage, in FIG. 2.

Returning to FIG. 5, the horizontal dashed-line succeeding step 850 represents a delineation between method steps related to obtaining the channel impulse response h(t) of the communication channel between the base and the target, and method steps related to using the obtained channel impulse response h(t) to pre-code data streams for transmission from the target to the base. The operation steps 510, 520, 830 and 840 collectively form a sounding process that characterizes the transmission medium 130 and provides the information on the transmission medium 130 to the target 804 for its time-reversal based data transmission to the base 202 as described in steps 850, 720, 860, 870 and 880 described below.

At step 850, the stored channel impulse response waveform H(t) is reversed in time domain. To obtain the time reversed channel impulse response waveform H(−t), the channel impulse response waveform H(t) is simply read (sorted) in reverse temporal order.

At step 720, a data stream is provided at the target-Tx for transmission to the base 202. The data stream can be generated locally at the target and can include instructions destined for the base. The data stream can also include replies to instructions received from the base.

At step 860, the target-TX 210 prepares a data-signal which includes a copy of the time reversed channel impulse response waveform H(−t) for each bit of the data stream. The discussion related to the preparation of the data-signal presented in reference to method 400, applies fully to method 500.

In step 870, the prepared (pre-coded) data-signal is emitted by the target-TX 210 to the base 490.

In step 880, the base-Rx 230 receives the data stream d(t), provided earlier by the target 804, at step 720. Therefore, method steps 850 to 880 enable transmission of a data stream d(t) provided at a target and destined for a base, by pre-coding each bit of the data stream with a copy of the time reversed channel impulse response waveform H(−t), corresponding to the transmission channel between the base and the target.

Data Transmission from Target to Base

The techniques for data communications between a base 202 and a target 804 described in reference to FIGS. 2-5 enable full duplex communications based on time reversal. Specifically, a number of method steps described in the previous section in reference to FIG. 5 are performed by target components. Such steps include digitizing a detected channel impulse response h(t) into a channel impulse response waveform H(t), as well as reversing in time domain the channel impulse response waveform H(t). The method described below does not call for a time reversal step performed at the target 804. The operation for reversing in time domain the channel impulse response waveform H(t) is performed at the base 202 and the result is wirelessly sent to the target 804 which saves it in its local memory for transmitting data to the base 202.

Figure 6:
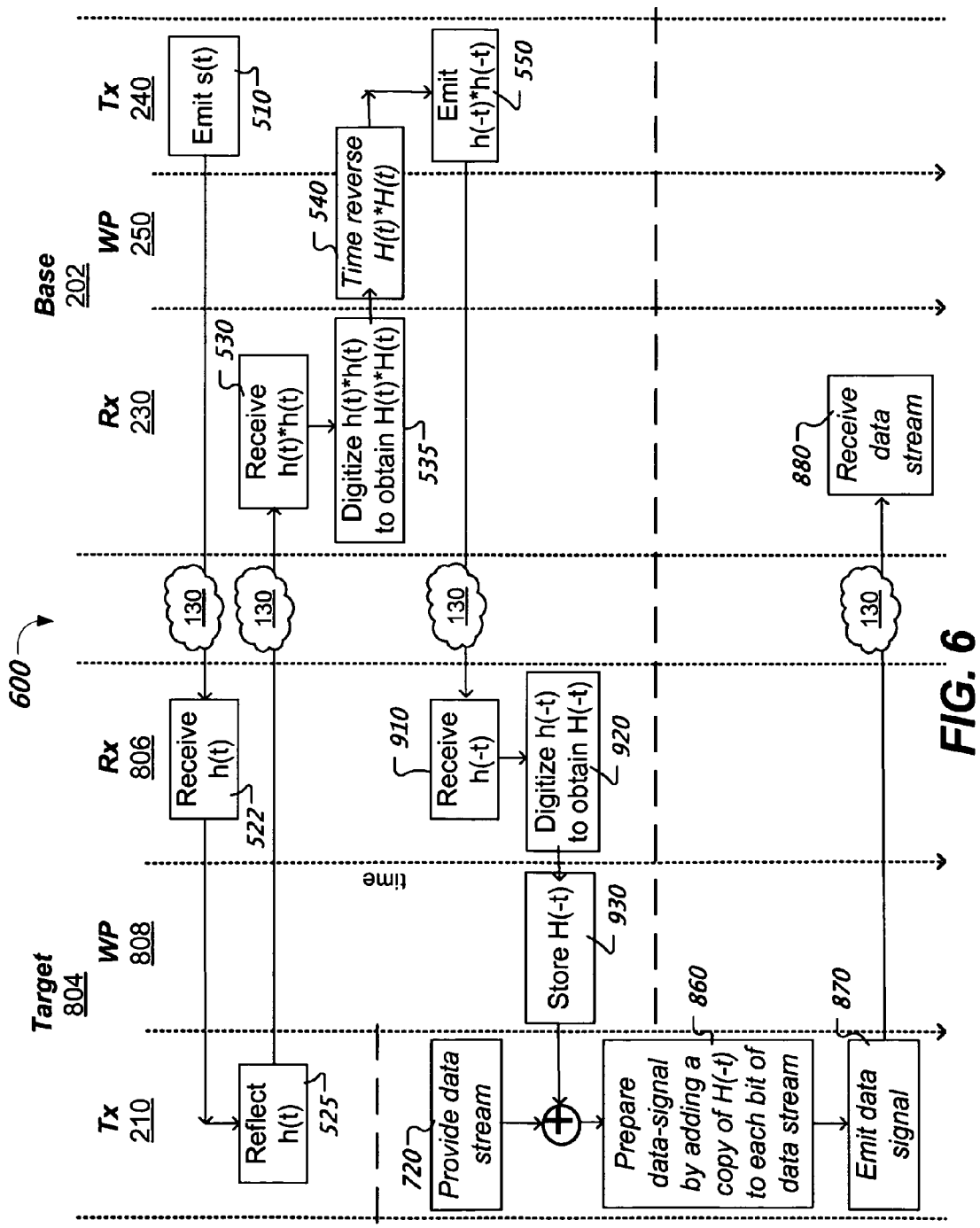
FIG. 6 is another method for data transmission between a target and a base.

The swim-lane diagram 600 in FIG. 6 illustrates an example of an detailed implementation of this method 600. The method 600 is depicted as a time sequence, with method steps performed earlier in time disposed at the top of diagram 600, and respectively method steps performed later in time disposed at the bottom of diagram 600.

The first or left-most (vertical) lane signifies the time sequence corresponding to the target-TX 210. The second lane corresponds to the time sequence of the target waveform-processor 808. The third lane corresponds to the time sequence of the target-Rx 806. Thus, the first through third lanes depict method steps performed at the target 804 location.

The fourth lane represents the communication channel 130. Notably, signals are being transmitted through the communication channel, for example between any of the steps 510 and 522, steps 525 and 530, steps 550 and 910, and steps 870 and 880.

The fifth lane illustrates the time sequence of the base-Rx 230. The sixth lane corresponds to the time sequence of the base waveform-processor 250. The seventh or right-most lane represents the time sequence of the base-Tx 240. Thus, the fifth through seventh lanes depict method steps performed at the base 202 location.

At step 510, the base-Tx 240 emits an impulse-pulse, s(t), using an omnidirectional antenna.

At step 522, the target-Rx 806 receives the channel impulse response, h(t), defined again as a set of copies of the impulse-pulse, s(t), each copy of the impulse-pulse, s(t), emitted by the base-Tx 240 arriving at the base-Rx 806 at a different time in accordance to a length of a respective multi scattering path traveled by the respective copy of the impulse-pulse, s(t), through the transmission channel between the base and the target.

At step 525, the received channel impulse response, h(t), is promptly emitted (returned) by target-Tx 210. Method steps 522 and 525 taken together effectively describe the reflecting by the target 804 of the channel impulse response h(t). For example, a target omni directional antenna, common to the target-Rx 806 and target-Tx 210, reflects the channel impulse response h(t) back into the transmission channel 130.

At step 530, the base-Rx 230 receives a copy of the channel impulse response, h(t), for each of the copies of the impulse-pulse, s(t), included in the channel impulse response h(t) reflected by the target at step 525. For example, for the reflected channel impulse response h(t) containing N copies of the impulse-pulse s(t), the base-Rx 230 receives N×N copies of the impulse-pulse s(t). Equivalently, at step 530, the base-Rx 230 receives the convolution of the channel impulse response with itself, h(t)*h(t). At step 535, the base-Rx 230 digitizes the received self-convolved channel impulse response, h(t)*h(t), to obtain a self-convolved channel impulse response waveform, H(t)*H(t). The self-convolved channel impulse response waveform H(t)*H(t) obtained at step 535 includes a set of digital samples, as described above with respect to FIG. 2.

At step 540, the self-convolved channel impulse response waveform H(t)*H(t) is reversed in time domain. As described in reference to methods 400 and 500, the time reversal step may involve simply reading (sorting) in reverse temporal order the self-convolved channel impulse response waveform H(t)*H(t).

At step 550, the time reversed self-convolved channel impulse response waveform H(−t)*H(−t) is emitted by the base-Tx 240 to the target 804.

At step 910, for each copy of the time reversed channel impulse response h(−t) emitted by the base as part of the time reversed self-convolved channel impulse response h(−t)*h(−t), there will be one pulse received by the target-Rx 806. The set of pulses received by the target-Rx 806 in this fashion form the time reversed channel impulse response h(−t). Equivalently, according to EQ. (3), the transmission channel "filters out" (or "de-convolves") h(−t) from the emitted time reversed self-convolved channel impulse response h(−t)*h(−t):

$$q(t)=s(t)*[h(-t)*h(-t)]*h(t)$$

$$q(t)=s(t)*h(-t)*[h(-t)*h(t)]=h(-t)*s(t)=h( \quad (5)$$

if s(t) is an impulse

In EQ (5), the signal q(t) received by the target-Rx 806 at step 910 represents the time reversed channel impulse response h(−t).

At step 920, the target-Rx 806 digitizes the received time reversed channel impulse response, h(−t), to obtain a time reversed channel impulse response waveform, H(−t).

At step 930, the time reversed channel impulse response waveform H(−t) is stored by the target waveform-processor 808. The horizontal dashed-line succeeding step 930 represents a delineation between method steps related to obtaining the time reversed channel impulse response h(−t) of the communication channel between the base and the target, and method steps related to using the obtained time reversed channel impulse response h(t) to pre-code data streams for transmission from the target to the base.

Notably, for method 500 described in the previous section, the reversal in time domain of the channel impulse response h(t) is performed at the target 804 location, where the data is transmitted from. In contrast to method 500, for method 600, the reversal in time domain of the channel impulse response h(t) is effectively performed at the base 202 location (steps 530-550,) away from where the data is transmitted. Subsequently, for method 600, the time reversed channel impulse response h(−t) is "provided" to the target 804 (steps 910-930), at the location where data is transmitted from.

At step 720, a data stream is provided at the target-Tx 210 for transmission to the base 202. The data stream can be generated locally at the target and can include instructions destined for the base. The data stream can also include replies to instructions received from the base.

At step 860, the target-TX 210 prepares a data-signal which includes a copy of the time reversed channel impulse response waveform H(−t) for each bit of the data stream. The discussion related to the preparation of the data-signal presented in reference to methods 400 and 500, applies fully to method 600.

In step 870, the prepared (pre-coded) data-signal is emitted by the target-Tx 210 to the base 490.

In step 880, the base-Rx 230 receives the data stream s(t), provided earlier by the target 804, at step 720. Therefore, method steps 860 to 880 enable transmission of a data stream s(t) provided at a target and destined for a base, by pre-coding each bit of the data stream with a copy of the time reversed channel impulse response waveform H(−t), corresponding to the transmission channel between the base and the target.

Data Transmission from One Target to Another Target

The above data communication methods 400, 500 and 600 based on time reversal enable full duplex communications between a target and a base, e.g., a remote target and a central base. It is also possible for transmitting data between two remote targets based on time reversal by using a base station as a relay between the two targets in a communications system 200. This may be useful for example when multipath effects make it difficult or impossible for direct transmission between the targets or when non-line of sight losses reduce signal power between the targets to levels that reduce the functionality of the communication.

Figure 7:
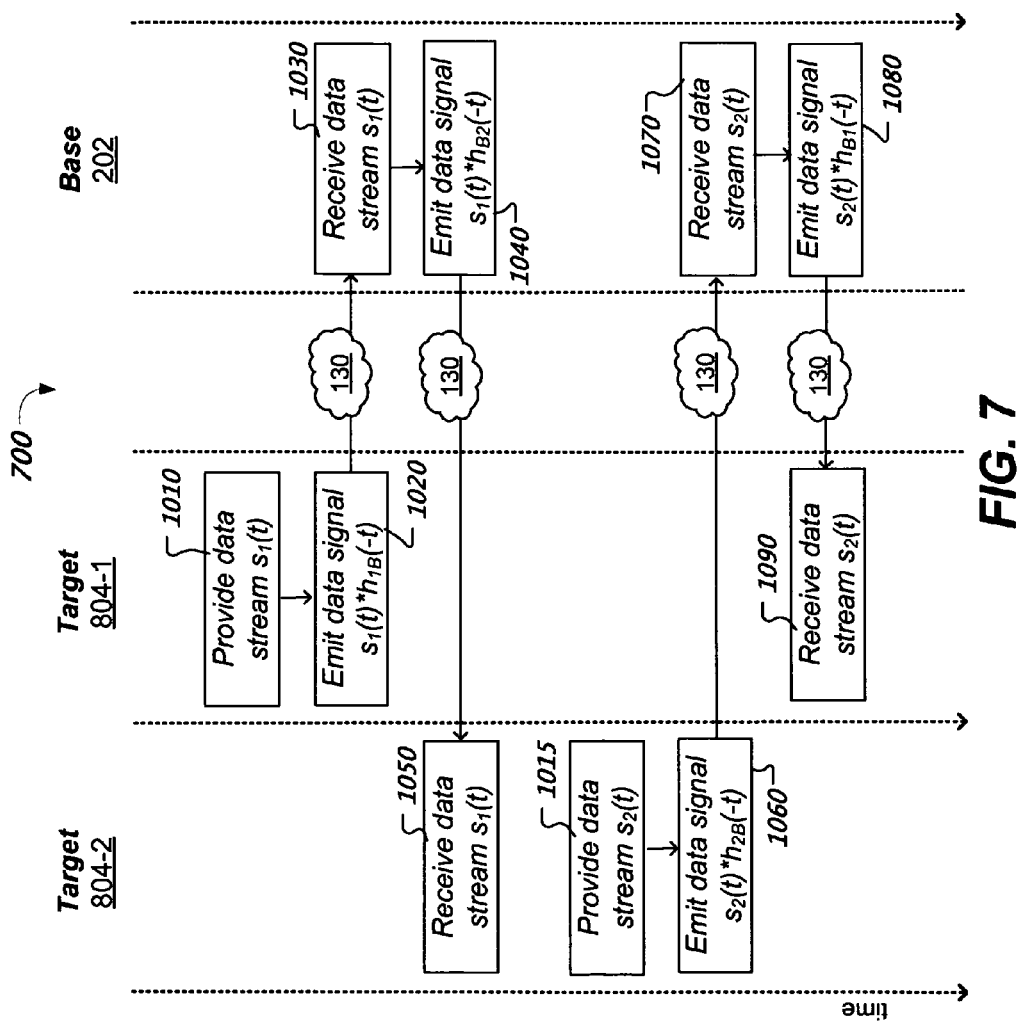
FIG. 7 is a method for data transmission between a first target and a second target.

FIG. 7 shows an example of data communication between two targets based on time reversal. In this example, the communications system 200 includes a base 202 and two or more remote targets, for example, targets 804-1 and 804-2. The base 202 is in communication with both targets 804-1 and 804-2 based on time reversal to rely data from one target to the other.

The swim-lane diagram 700 in FIG. 7 illustrates the communication technique based on time-reversal, for transmitting data from a target 804-1 to another target 804-2, via a base 202. The method 700 is depicted as a time sequence, with method steps performed earlier in time disposed at the top of diagram 700, and respectively method steps performed later in time disposed at the bottom of diagram 700.

Moreover, diagram 700 depicts only method steps that occur during the data stream communication stage, while diagram 700 does not include prior method steps performed for obtaining the channel impulse response. Prior to performing method 700, the base 202 has obtained the time reversed channel impulse response waveforms $H_{B1}(-t)$ and $H_{B2}(-t)$, according to method 400, corresponding to the transmission channels between the base and respectively targets 804-1 and 804-2. Additionally, prior to performing method 700, the target 804-1 has obtained the time reversed channel impulse response waveform $H_{1B}(-t)$, according to method 500 or 600, corresponding to the transmission channel between the base and target 804-1. Similarly, prior to performing method 700, the target 804-2 has obtained the time reversed channel impulse response waveform $H_{2B}(-t)$, according to method 500 or 600, corresponding to the transmission channel between the base and target 804-2.

Returning to diagram 700, the first or left-most (vertical) lane depicts method steps performed at the location of target 804-2. The second lane depicts method steps performed at the location of target 804-1.

The third lane represents the communication channel 130. Notably, signals are being transmitted through the communication channel, for example between any of the steps 1020 and 1030, steps 1040 and 1050, steps 1060 and 1070, and steps 1080 and 1090.

The fourth or right-most lane depicts method steps performed at the base 202 location.

At step 1010, a data stream s1(*t*) is provided at the target 804-1 for transmission to the target 804-2. The data stream can be generated locally at the target 804-1 and can include instructions destined for the target 804-2. The data stream can also include replies to instructions received from the target 804-2.

At step 1020, a data-signal s1(*t*)*$h_{1B}(-t)$, prepared (pre-coded) at the target 804-1 based on the procedure illustrated in FIG. 3, is emitted from target 804-1 using an omni-directional antenna. As stated above, the time reversed channel impulse response $h_{1B}(-t)$, corresponding to the transmission channel between the target 804-1 and the base 202, has been previously acquired by the target 804-1, based on method 500 or 600.

At step 1030, the base 202 receives the data stream s1(*t*) provided earlier at target 804-1 and destined for target 804-2. The destination of the data stream s1(*t*) for target 804-2, distinct from target 804-1 (originating target) or any other target (e.g., 804-3, etc.,) can be encoded in the data stream s1(*t*). For example, if the communication is based on data packets, the target destination of the data stream s1(*t*) can be specified in a packet header of a data packet that includes the data stream s1(*t*).

Preparing (pre-coding) the data-signal, s1(*t*)*$h_{1B}(-t)$, based on the procedure illustrated in FIG. 3 causes the transmission channel between the base 202 and the target 804-1 to filter out portions of the emitted data-signal, s1(*t*)*$h_{1B}(-t)$, different from the data stream s1(t), and consequently enables the base 202 to receive substantially only the data stream s1(t).

At step 1040, a data-signal s1(t)*$h_{B2}$(−t), prepared (pre-coded) at the base 202 based on the procedure illustrated in FIG. 3, is emitted from base 202 using an omni-directional antenna. The emitted data signal, s1(t)*$h_{B2}$(−t), is prepared by the base 202 from the received data stream s1(t) and the time reversed channel impulse response $h_{B2}$(−t), corresponding to the transmission channel between the target 804-2 and the base 202. The time reversed channel impulse response $h_{B2}$(−t) has been previously acquired by the base 202 based on method 400.

In addition to the time reversed channel impulse response $h_{B2}$(−t), corresponding to the transmission channel between the base 202 and the target 804-2, the base 202 stores the respective time reversed channel impulse responses h(−t) corresponding to transmission channels between the base 202 and each respective target in communication with the base 202. The base 202 chooses a time reversed channel impulse response h(−t) corresponding to an appropriate target based on a target destination encoded in the received data stream s1(t).

At step 1050, the target 804-2 receives the data stream s1(t) provided earlier at target 804-1 and destined for target 804-2. Preparing (pre-coding) the data-signal, s1(t)*$h_{B2}$(−t), based on the procedure illustrated in FIG. 3 causes the transmission channel between the base 202 and the target 804-2 to filter out portions of the emitted data-signal, s1(t)*$h_{B2}$(−t), different from the data stream s1(t), and consequently enables the target 804-2 to receive substantially only the data stream s1(t).

At step 1015, in response to the message contained in the received data stream s1(t), target 804-2 may provide data stream s2(t). The previous steps of method 700 can be applied in reverse order to transmit the provided data stream s2(t) from the target 804-2 to the target 804-1 via the base 202.

At step 1060, a data-signal s2(t)*$h_{2B}$(−t), prepared (pre-coded) at the target 804-2 based on the procedure illustrated in FIG. 3, is emitted from target 804-2 using an omni-directional antenna. As stated above, the time reversed channel impulse response $h_{2B}$(−t), corresponding to the transmission channel between the target 804-2 and the base 202, has been previously acquired by the target 804-2, based on method 500 or 600.

At step 1070, the base 202 receives the data stream s2(t) provided earlier at target 804-2 and destined for target 804-1. Preparing (pre-coding) the data-signal, s2(t)*$h_{2B}$(−t), based on the procedure illustrated in FIG. 3 causes the transmission channel between the base 202 and the target 804-2 to filter out portions of the emitted data-signal, s2(t)*$h_{2B}$(−t), different from the data stream s2(t), and consequently enables the base 202 to receive substantially only the data stream s2(t).

At step 1080, a data-signal s2(t)*$h_{B1}$(−t), prepared (pre-coded) at the base 202 based on the procedure illustrated in FIG. 3, is emitted from base 202 using an omni-directional antenna. The emitted data signal, s2(t)*$h_{B1}$(−t), is prepared by the base 202 from the received data stream s2(t) and the time reversed channel impulse response $h_{B1}$(−t), corresponding to the transmission channel between the target 804-1 and the base 202. The time reversed channel impulse response $h_{B1}$(−t) has been previously acquired by the base 202 based on method 400.

At step 1090, the target 804-1 receives the data stream s2(t) provided earlier at target 804-2 and destined for target 804-1. Preparing (pre-coding) the data-signal, s2(t)*$h_{1B}$(−t), based on the procedure illustrated in FIG. 3 causes the transmission channel between the base 202 and the target 804-1 to filter out portions of the emitted data-signal, s2(t)*$h_{B1}$(−t), different from the data stream s2(t), and consequently enables the target 804-1 to receive substantially only the data stream s2(t).

Based on the description presented above, the time-reversal based method 700 allows for a remote target to transmit a data stream to any other remote target that belongs to the communication system 200. However, the target can accomplish the foregoing without knowledge of the transmission channels between the target and all the other targets in the communication system. Equivalently, the target does not need to obtain and store the time reversed channel impulse response corresponding to the transmission channels between the target and all the other targets in the communication system. However, the target obtains and stores the time reversed channel impulse response corresponding to the transmission channel between the base and the target.

The base 202 obtains and stores the time reversed channel impulse response corresponding to the transmission channels between the base and all the targets in the communication system 200. This load sharing arrangement allows for a communication system for which the heavy duty signal processing and storage effort occurs at the central base 202 and not at the remote targets.

The time-reversal data communication techniques described in this document are based on obtaining an accurate channel impulse response waveform H(t) corresponding to the communication channel between a target 204 (or 804) and a base 202. This aspect is now described below with reference to FIGS. 8-12.

Acquisition of the Channel Impulse Response at Intermediate Frequencies

The communication medium for a communication system 200 based on time reversal can be confined to a well defined conduit or can be unconfined (e.g., free space). Well defined conduits come in the form of conducting wires, waveguides, or dielectric fibers. In the case of wired communications a carrier signal is emitted into a wire (as defined above), transmitted through the wire, and detected from a wire. The wire naturally confines carrier signals and determines the propagation direction of the carrier signals.

In contrast to wired communications, the carrier signal is emitted into free space or a medium in wireless communications. Even if operating in free space, an emitter can emit the carrier signal under a well controlled direction, e.g., in the form of a collimated beam. Directional antennas are used to emit and receive such collimated carrier signals. Additionally, and uniquely specific to wireless communications, the carrier signal can be emitted in "all" spatial directions. Omni-directional antennas are used to emit a carrier signal in all spatial directions.

Whether wireless or wired communications, carrier signal propagation through the communications channel can be affected by multi-path scattering or reflections. Scattering or reflection centers within the transmission medium and their effect on wave propagation have been discussed in detail at the beginning of the detailed description. Fiber cladding and scattering centers within the core of a multimode optical fiber represent examples of scattering centers within the transmission medium for wired communications. Therefore, both wireless and wired communications can benefit from the communications techniques based on time reversal disclosed herein.

Electromagnetic waves from various spectral regions of the electromagnetic spectrum can be used as carrier signals. Carrier signals from certain spectral regions are mostly used for wired communications and other carrier signals from different spectral regions are mostly used for wireless communications. For example, wired communications based on optical fibers use carrier signals having optical frequencies. An example of carrier signals used for wireless communications are radio frequency (RF) carrier signals.

The spectral delineation between the wired and wireless communications is not rigid, in fact in certain instances, carrier signals from the spectral regions mentioned above can be used interchangeably for wireless and wired communications. For example, there are special cases of free-space (fiber-less) optical communications, and there are special cases of wave-guided RF communications. Examples of widely used carrier signals, for both wireless and wired communications, include RF, millimeter, Terahertz and optical. The current section describes methods and systems for communications based on time reversal applicable to carrier signals from any of the spectral regions enumerated above.

Figure 8:
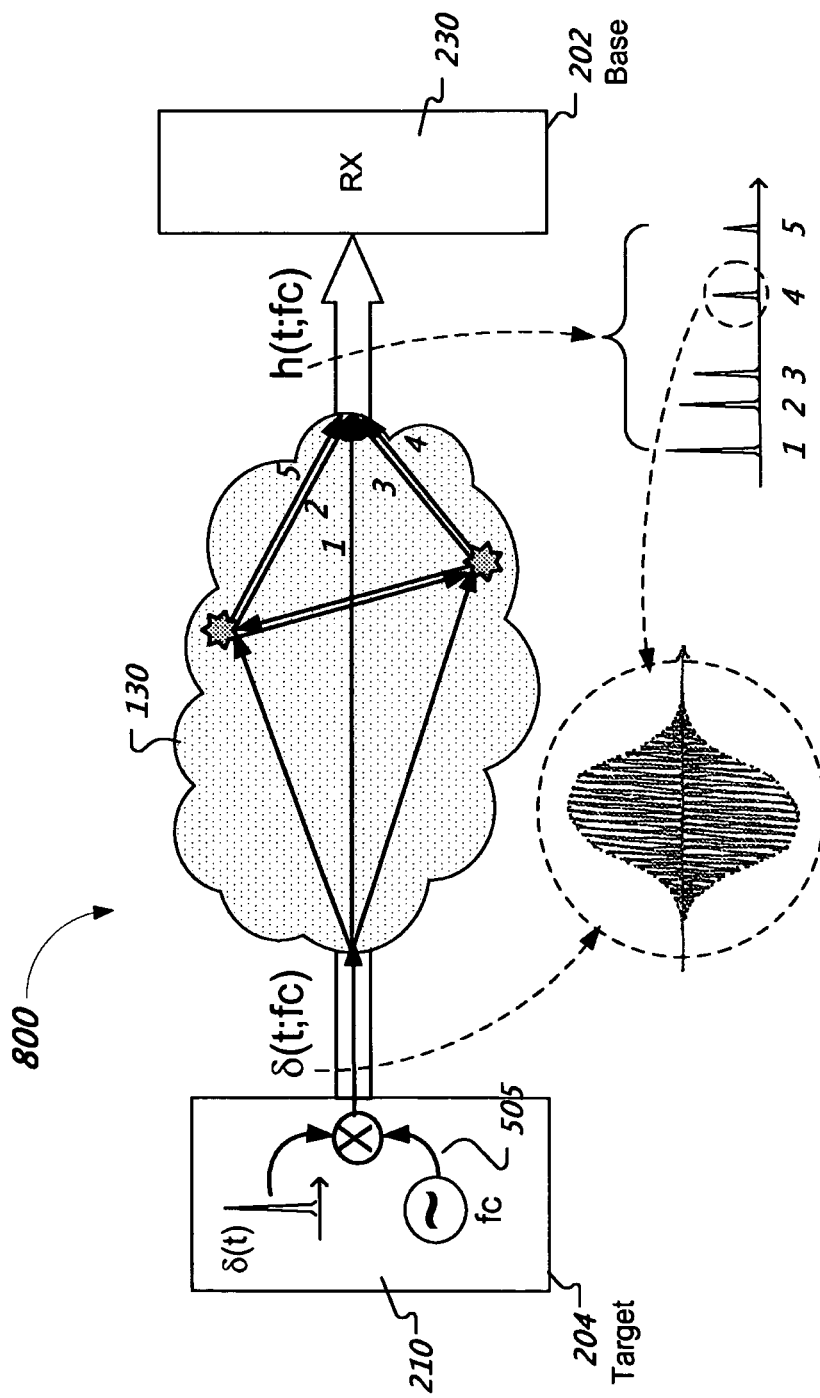
FIG. 8 is a schematic illustrating transmission of a channel probing impulse from a target to a base.

FIG. 8 illustrates portions of a communications system 800 including a base 202 and a target 204. The communication channel 130 between the base and the target can be free space, for example in the case of RF wireless communications. The communication channel 130 between the base 202 and the target 204 can also be a guided medium, for example a multimode optical fiber in the case of optical communications. Only two scattering or reflecting centers have been illustrated in the communication channel 130. These two scattering centers determine four multi scattering propagation paths, denoted respectively 2, 3, 4 and 5, in addition to the line-of-sight propagation path, denoted 1.

In FIG. 8, only the target-TX 210 is explicitly illustrated for the target 202. The target-TX 210 includes a modulator 505. The modulator combines a pulse s(t) with a carrier signal having a carrier frequency fc. This pulse s(t) modulated at the carrier frequency is emitted by the target-TX 210 as the channel mapping impulse, (t; fc), introduced in reference to FIG. 2.

The time dependence of the pulse s(t) defines a base band frequency, $f_B$. For example, the inverse time duration of the pulse s(t) defines an upper bound for the base band spectrum, $f_B$. The base band spectral width is also $f_B$, because the minimum base band frequency is zero, and the maximum is $f_B$. Data streams provided by the target-TX 210 are also limited by the base band spectrum $f_B$. For example, if the base band frequency $f_B$=1 GHz, then the width of the pulse s(t) can be 1 ns or more. Also, a data stream generated by a target-TX 210 having a base band of $f_B$=1 GHz has a data bandwidth of 1 Gbit/sec or less.

The local oscillator that is part of the modulator 505 determines the frequency fc of the carrier signal. The carrier frequency is larger than the base band frequency $f_B$. If, for example, the carrier frequency fc is 1 order of magnitude higher than the base band frequency fB, then the carrier signal is an RF wave. If, for example, the carrier frequency fc is 6 orders of magnitude higher than the base band frequency fB, then the carrier signal is an optical wave.

The circular inset of FIG. 8 shows the temporal dependence of the channel mapping impulse pulse, (t; fc), as emitted by the target-TX 210. The amplitude of the sinusoidal oscillation of the carrier signal is modulated by the impulse pulse s(t) generated by the target-TX 210. In other implementations, frequency, phase or level modulations can be applied.

For illustrative purposes only, FIG. 8 shows only the base-RX 230 for the base 202. As described above, the base-Rx 230 receives a channel impulse response, h(t; fc), defined as a set of copies of the impulse-pulse, s(t; fc), each copy of the impulse-pulse, s(t; fc), emitted by the target-Tx 210 arriving at the base-Rx 230 at a different time in accordance to a length of a respective multi scattering path traveled by the respective copy of the impulse-pulse, s(t; fc), through the transmission channel between the target and the base.

In the example shown in FIG. 8 with two scattering centers, there are five copies of the impulse-pulse s(t; fc) emitted by the target which arrive at the base to form the channel impulse response, h(t; fc). The inset on the lower-right side of FIG. 8 illustrates the set of copies of the impulse-pulse s(t; fc) arriving at the base respectively along each of the five paths labeled 1-5. The earliest arriving copy of the impulse-pulse s(t; fc) travels along the line-of-sight path 1. Also note that the channel impulse response, h(t; fc), is modulated at the carrier frequency fc.

Based on the techniques described above with respect to FIGS. 2, 4-6, the received channel impulse response h(t; fc) is digitized to obtain a channel impulse response waveform H(t; fc). The digitizing step can be performed if the sampling rate of the analog-to-digital converter of the base-RX 230 (digitizer) is larger than the carrier frequency. For example, if the carrier signal is in the optical domain, no existing digitizer can capture the amplitude and the phase of the optical carrier. Therefore, for carrier frequencies fc larger than the sampling frequency of the digitizer, the carrier frequency is down-shifted to intermediate frequencies (IF), fi, such that, fi is less than the sampling frequency of the digitizer.

Figure 9:
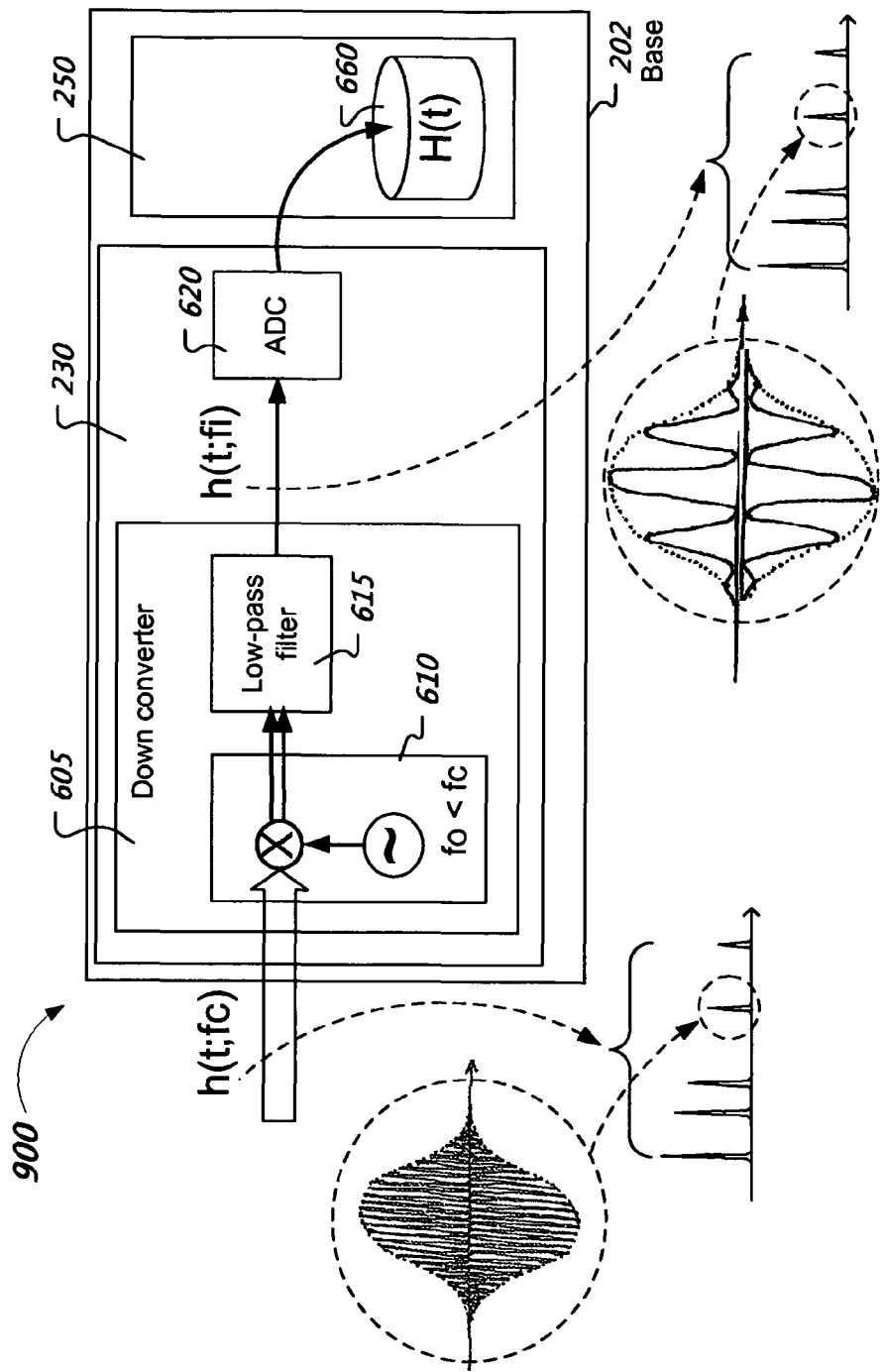
FIG. 9 is a schematic illustrating components of a base for acquiring an impulse response corresponding to a communication channel between a target and the base.

FIG. 9 shows components of an exemplary implementation of the base-RX 230 for downshifting the carrier frequency. The base in this example is configured to downshift the carrier frequency that modulates the received channel impulse response h(t; fc) to an IF channel impulse response h(t; fi), before digitizing the later one. A down converter 605 is disposed at the input of the base-RX 230. The down converter includes a mixer 610. The down converter receives the channel impulse response h(t; fc) modulated at the carrier frequency (see inset at the left side of FIG. 9.)

The mixer 610 mixes the received channel impulse response h(t; fc) modulated at carrier frequency fc with a signal generated by a local oscillator having a frequency of smaller than the carrier frequency, fo<fc. The output of the mixer 610 includes a signal at the sum frequency, and a signal at the difference frequency, fi=fc−fo. The signal at the sum frequency is discarded, and only the channel impulse response h(t; fi) modulated at the intermediate frequency is passed by a low-pass filter 615.

The inset at the bottom-right side of FIG. 9 shows the channel impulse response, h(t; fi) modulated at the intermediate frequency fi, provided at the output of the down converter 605. The frequency of the local oscillator, fo, is chosen to be close to fc, such that the intermediate frequency, fi=fc−fo, is smaller than the sampling frequency of the digitizer (ADC) 620. For example, if the sampling frequency of the digitizer is 4G samples/sec, than fi has to be ~1 GHz, or less. The digitizer 620 digitizes the channel impulse response h(t; fi) modulated at the intermediate frequency fi to obtain a channel impulse response waveform, H(t; fi) at the intermediate frequency fi.

The digitized channel impulse response waveform, H(t; fi) at the intermediate frequency fi is communicated from the base-RX 230 to the base waveform-processor 250. For example, the channel impulse response waveform, H(t; fi), is stored in base-storage 660. Base-storage 660 can be RAM, hard-drive, solid-state memory, removable or non-removable memory.

The transmitter 240 can be configured to emit an analog data signal modulated at a second carrier frequency. The transmitter includes a multiplexer communicatively coupled to the waveform processor. The multiplexer can be configured to produce a data signal including a copy of the time reversed channel impulse response waveform for each bit of a data stream that includes information to be provided to the remote target.

The transmitter 240 can include an digital-to-analog converter (DAC) downstream from the multiplexer. The DAC configured to convert the produced data signal into the analog data signal. The transmitter also includes an oscillator to generate a local signal at the carrier frequency. A mixer having an input coupled to the DAC and another input coupled to the oscillator. The other mixer combines the analog data signal with the local signal at the second frequency to obtain the analog data signal modulated at a carrier frequency. The carrier frequency is equal to the difference between the oscillator frequency and baseband frequency.

Figure 10:
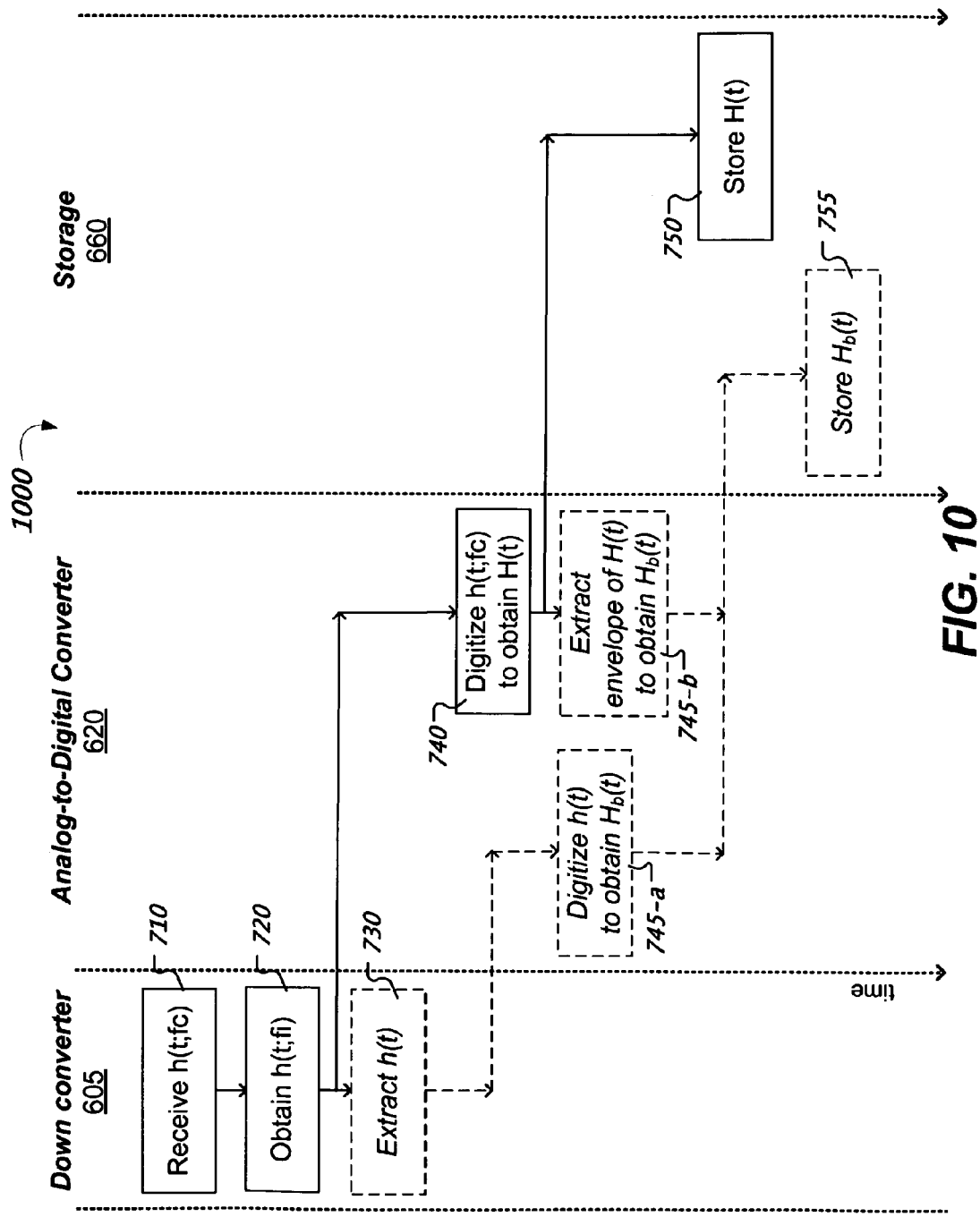
FIG. 10 is a method for processing an acquired impulse response corresponding to a communication channel between a target and the base.

The swim-lane diagram 1000 in FIG. 10 illustrates a technique used to obtain a to channel impulse response waveform H(t; fi) at an intermediate frequency fi from a received channel impulse response h(t; fc) modulated at a carrier frequency. The method 1000 is depicted as a time sequence, with method steps performed earlier in time disposed at the top of diagram 1000, and respectively method steps performed later in time disposed at the bottom of diagram 1000.

The first or left-most (vertical) lane signifies the time sequence corresponding to the down converter 605. The second lane corresponds to the time sequence of the Analog-to-Digital Converter 620. Thus, the first two lanes depict method steps performed at the base-RX 230. The third lane corresponds to the time sequence of the Storage 660. Thus, the third lane depicts method steps performed at the base waveform processor 250.

At step 710, the base-RX 230 receives channel impulse response h(t; fc) modulated at a carrier frequency. Depending on the specific communication system, the carrier frequency can be RF, millimeter, Terahertz or optical frequencies.

At step 720, the down converter 605 obtains the channel impulse response h(t; fi) modulated at an intermediate frequency fi by combining the received channel impulse response h(t; fc) modulated at the carrier frequency with a signal generated by the local oscillator and having an oscillator frequency fo. The intermediate frequency is the difference between the carrier frequency fc and the oscillator frequency fo.

At step 730, in an alternative implementation, the local oscillator frequency can be adjusted to be substantially equal to the carrier frequency. Therefore, the intermediate frequency fi=0 and the output of the mixer 610 becomes the channel impulse response h(t) at base band.

Another way to obtain the channel impulse response h(t) at base band is to follow method step 720 by a second down-conversion step, using a second mixer to obtain the channel impulse response h(t; i2) modulated at a second intermediate frequency fi2. If a second local oscillator has a frequency fo2 substantially equal to fi, then the output of the second mixer becomes the impulse response h(t) at base band (f2i=0).

At step 740, an analog-to-digital converter (ADC) 620 downstream from the first mixer digitizes the obtained channel impulse h(t; fi) modulated at the intermediate frequency fi into a channel impulse response waveform H(t).

At alternative step 745-a, the ADC 620 digitizes the channel impulse response h(t) at base band (obtained either at step 730, or using the other way to obtain the impulse response h(t) at base band described above) to obtain a channel impulse response waveform Hb(t) at base band.

At another alternative step 745-b, the ADC 620 extracts from the channel impulse response waveform H(t) the envelope of H(t) to obtain a channel impulse response waveform Hb(t) at base band.

At step 750, the channel impulse response waveform H(t) is being stored at storage 660. Note that the channel impulse response waveform H(t) includes a modulation at the intermediate frequency fi.

At alternative step 755, the channel impulse response waveform Hb(t) at base band is being stored at storage 660.

Either the channel impulse response waveform H(t) or the channel impulse response waveform Hb(t) at base band can be reversed in time domain and subsequently used to prepare data-signals for transmission from the base back to the target (according to method 400).

In the above implementation, the time reversed signal is extracted from a signal propagating with a carrier frequency and is upshifted back to the original carrier frequency before retransmission into the network. However, this is not always necessary. For example, the signal could be upshifted to a different carrier frequency, or under some conditions may not be upshifted at all.

The following describes example techniques for detection of data streams by the target receiver. Several exemplary implementations of components and their functionality are also presented.

Acquisition of Data Streams at a Target Receiver

Referring back to FIG. 3, a data stream 310 provided at a base 202, including a random sequence of 1 and 0 bits, can be detected at the target-RX as a data stream 310' closely matching the provided data stream 310.

The data-signal emitted by the base 202 as an output signal 370, can be prepared as described in method 400, traverses the multipath transmission channel 130 and arrives at the target 204. The respective emitted copy of the time reversed channel impulse response h(T−t) 270 corresponding to each bit at the base 202 has been matched and filtered during propagation from the base 202 to the target 204, as described by EQs. 2 and 3. The target-RX 220 detects the data stream signal d(t) 310', free of the inter-symbol interference caused by the multipath transmission channel 130. The process of time reversal matched filtering which is described above ensures that any copies of the impulse signal that propagate up to the base and then return to the target along the identical path will arrive back at the target and overlap with one another in time. Under this condition, copies of the impulse signal sum together coherently to create both the temporal and spatial focusing of the signal to produce a sharp pulse with the same duration as the impulse signal. However any copies of the impulse that travel along one path and return along a different path to the target may not be aligned and may spread out over time, thus creating a background interference signal. The background interference of one pulse may overlap with the peak of an adjacent pulse which degrades the signal-to-noise-ratio (SNR) of the desired signal. In fact there may be multiple pulses whose background interference overlap with another pulse creating a serious source of degradation. This is a form of intersymbol interference.

A target-RX 220 having good resolution and high detection bandwidth (Nyquist Bandwidth) integrates the received data stream 310' over each bit to obtain high SNR reception. However, such a Nyquist Bandwidth limited receiver also integrates the background interference over one bit, and hence degrades the signal-to-interference ratio (SIR).

Figure 11:
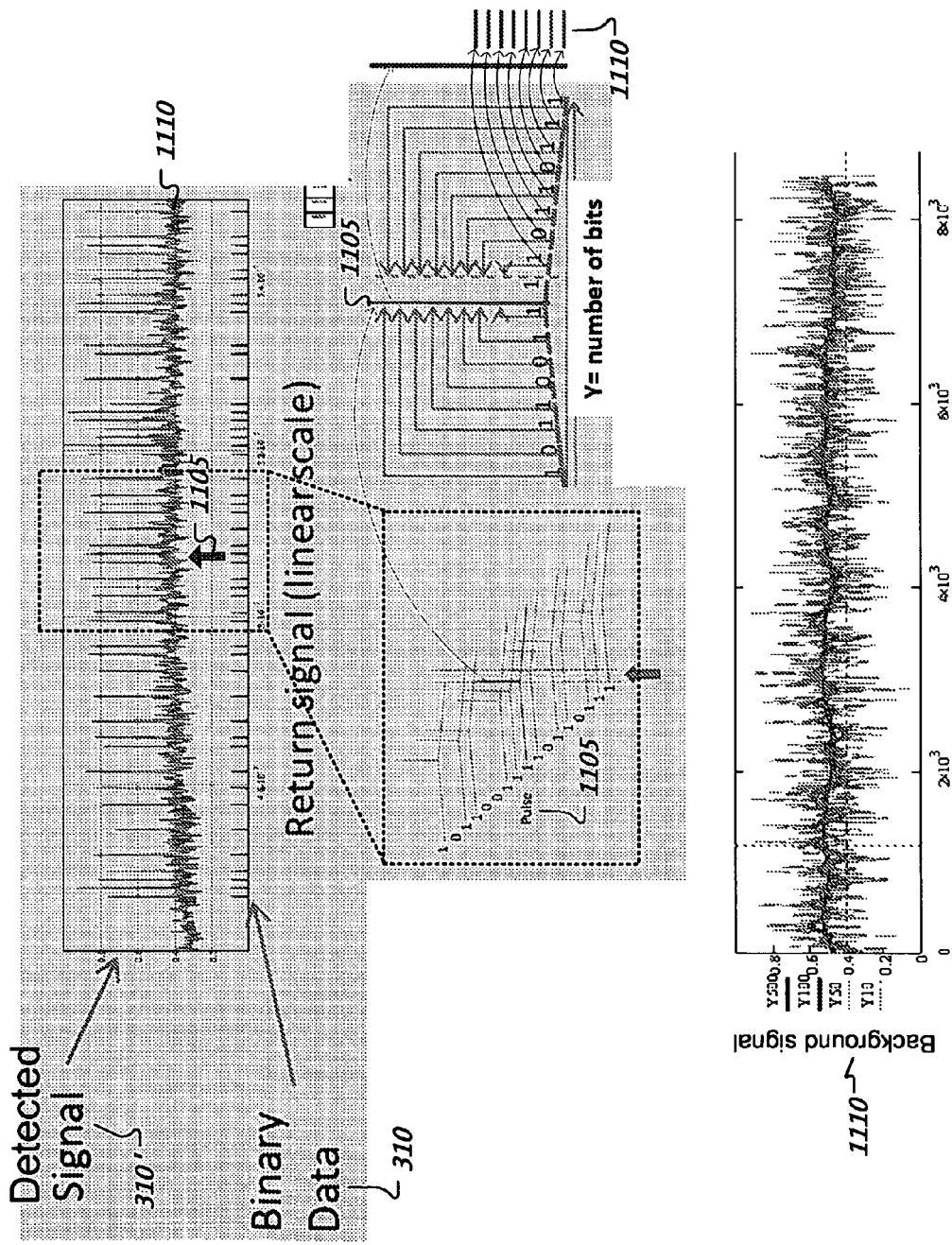
FIG. 11 illustrates characteristics of an acquired data stream detected by a target.

FIG. 11 illustrates in the top panel the received data stream (detected signal) 310' in comparison with the data stream (binary data) 310 provided by the base 202. The background interference 1110 is also shown in the top panel of FIG. 11. The rectangular inset in the center of FIG. 11 shows a sequence of pulses 1105 detected at the target-RX and coded by the data sequence such that a pulse is received if a bit for "1" is transmitted and nothing is received if a bit for "0" is transmitted. In reality the pulses are overlapped so that they are not displaced in the vertical direction as shown here and the net background interference is the sum of the background interference of all the individual pulses with the appropriate overlap. In this diagram they are shown vertically displaced to highlight the contribution from each pulse. The net background interference is calculated by summing the returns from each pulse along any vertical line on the diagram and then integrated by the receiver bandwidth.

To the right side of the rectangular inset in the center of FIG. 11, an equivalent representation of the background from an array of pulses (from the rectangular inset) is represented as an integrated background of a single pulse 1105 weighted by the random data pattern corresponding to the data stream 310. This shows that the more complicated procedure for calculating the background interference shown in 1105 can be greatly simplified by looking at the background interference of a single pulse, and dividing it into segments equal to 1 bit period each segment and them summing those contributions at the time where the large peak pulse occurs, but ensuring that various segments being summed are weighted by the data sequence of ones and zeros where weighting by a zero implies that we ignore the effect of that particular segment and weighting by a one implies we take full account of that segment. This has an advantage for a real time-reversal system. The information for calculating the background interference is contained in the impulse response h(t) and the data stream. Since these are both known by the transmitter in advance, they can be removed. Alternately the effect can be removed in some cases very simply at the target receiver with no preprocessing at the transmitter. The panel at the bottom of FIG. 11 represents the background signal 1110 plotted for a large number of bits when the impulse pulse is narrow compared to the duration of a data bit and the pulses substantially resolve the different multipath scatterers in the path. This is equivalent to that there is little overlap between the multipath echoes in the captured channel response. The different plotted background signals correspond to different lengths of the channel impulse response h(t) in terms of number of bits Y. For example, the background signal having the largest variance corresponds to a channel impulse response h(t) that covers 10 bits. In contrast, the background signal having the smallest variance corresponds to a channel impulse response h(t) that covers 500 bits. Notably, the background power has a mean level of 50% of the signal power. Additionally, the variance of the background power is due to the changing pattern of the bit sequence, according to the data stream 310 provided by the base 202. However, the mean of the background (signal) power is statistically constant from bit to bit and in fact the actual sum of the total background interference power changes very little from bit to bit since the only significant weighted components of all the summed background segments that change from bit to bit are the first and last component which represents a very small total change particularly if the impulse response is long compared to the bit period. As such, the difference between two adjacent bits can be used to substantially cancel or minimize the background noise, which is almost identical from one bit to the next. Note that the difference in power between two adjacent signals is a differentially encoded version of the data stream. This differential signal can be decoded by a differential encoding technique.

Figure 12:
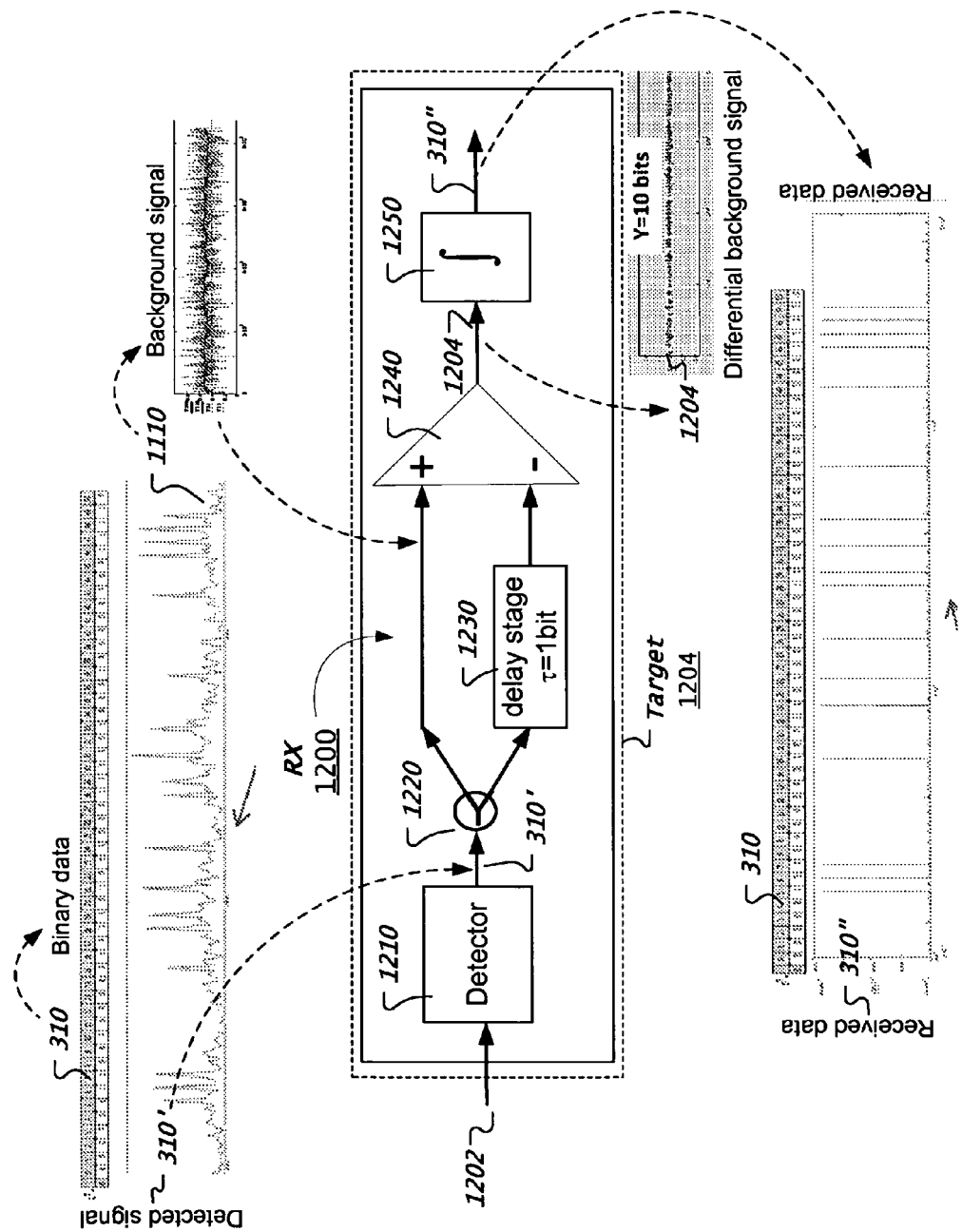
FIG. 12 is a schematic illustrating components of a target for acquiring a data stream.

FIG. 12 illustrates an exemplary implementation of a target-RX 1200 configured to perform differential post processing on the received data stream 310' based on the property of the background (signal) power not changing significantly from bit to bit. The target-RX 1200 includes a detector 1210 configured to receive a data stream 310'. The received data stream is illustrated in the panel at the top of FIG. 12, alongside the data stream 310 provided at the base 202. Also depicted at the top of FIG. 12 is the background (signal) power 1110 extracted from the detected signal 310' (for illustration purposes only).

The received signal 310' is passed through a splitter 1220 to form two copies of the received signal 310'. One of the copies is passed through delay stage 1230. The delayed and non-delayed copies of the received signal 310' are then input in a differentiator 1240 to subtract the delayed copy from the non-delayed copy of the received signal 310'. The result of the subtraction is a differentiated signal free from the statistically constant average of the background signal. The differential background signal 1204 is centered on zero and has small variance (see panel at lower right side of FIG. 12.)

In an exemplary implementation, the differentiated signal is then passed through an integrator 1250, which can be a channel filter for optimizing SNR, to recover a received data signal 310" from the differentiated signal. The received data signal 310" reproduces the peaks of the data stream 310 provided by the base 202, and has background variance one order of magnitude smaller than the background of the received data stream 310'.

In the above examples, the time-reversal technique is applied by capturing the impulse response h(t) of the channel path in its entirety, reversing the impulse response in time, convolving it with the desired signal stream and retransmitting the convolved signal back through the channel. Alternatively, it is also possible to truncate the impulse response and to use only a fraction of the response for time-reversal. This technique can be used if the base has inadequate storage space or cannot tolerate the long latencies required to process the entire signal. For example, in extreme cases, the full impulse response may persist for 10,000 bit periods. It is assumed that a truncated impulse response will cause a degradation in the final SNR at the target receiver, however this degradation will be proportional to the degree of truncation of the impulse response. In some implementations, system 1200 can time reverse a truncated version of the impulse response h(t) or any signal, digital or analog, derived from h(t). In addition, system 1200 can truncate the time-reversed version of the impulse response, i.e. h*(T−t) or any signal, digital or analog, derived from h*(T−t).

In the above technical description we refer to the impulse response being generated by a node emitting an "impulse". This is merely the simplest signal from which the impulse response can be derived. Other signals can be used, for example, a sequence of impulses optimized for recovery of the signals in noise or to enable noise to be averaged from the recovered impulse signal. Different shaped pulses may also be employed. One variant of pulse shape is that the impulse is not technically a mathematical delta function but a pulse shaped by the transmit filter function and the emitting antenna which may differentiate the current fed to the antenna with respect to time. The node which is responsible for time reversing the impulse response knows what pulse shape or sequence is employed so that it can deconvolve the impulse response from the received signal.

Heterodyne Time Reversal System

The above described time reversal data transmission techniques and systems can be implemented in systems where signals to be transmitted over the channel, are first upshifted to a higher carrier frequency before transmission across the channel. The signals can subsequently be recovered at the other end of the link by mixing the signal with in-phase and quadrature local oscillators designed to downshift the signals to baseband or to a useful intermediate frequency. In such a time reversal system, the signal that results from sounding the channel is first mixed with a local oscillator to recover the in-phase and quadrature versions of the signal. Notably, these signals are not combined further in a detection process but remain as separate signals, each component being separately digitized, time reversed and convolved with the data stream to create two independent time reversed signal streams. After conversion to an analogue signal in a digital to analog conversion processor, the in-phase component is then combined with an in-phase version of the local oscillator to upshift the signal to a carrier frequency and the quadrature component is combined with a quadrature version of the same local oscillator to up-shift to a quadrature version of the same carrier. The signals are then summed to create a composite RF signal which is then transmitted across the link to the target receiver. Upon reception at the receiver, the signal is detected and downshifted to the desired frequency by combining with an in-phase and quadrature version of a local oscillator. The data signals are then recovered by simply adding the signals together. This aspect of the present time reversal system eliminates the need for further processing with non-linear components or DSP to recover the signal in some other systems where in-phase and quadrature components undergo a detection process in which the in-phase and quadrature signals are combined into a single signal in some manner that optimally recovers the data from the signals by, e.g., directing the signals through a square law detector or other nonlinear device or can be processed using DSP algorithms to extract the underlying signal while still having noise effects induced by the multipath propagation through the channel.

Figure 13:
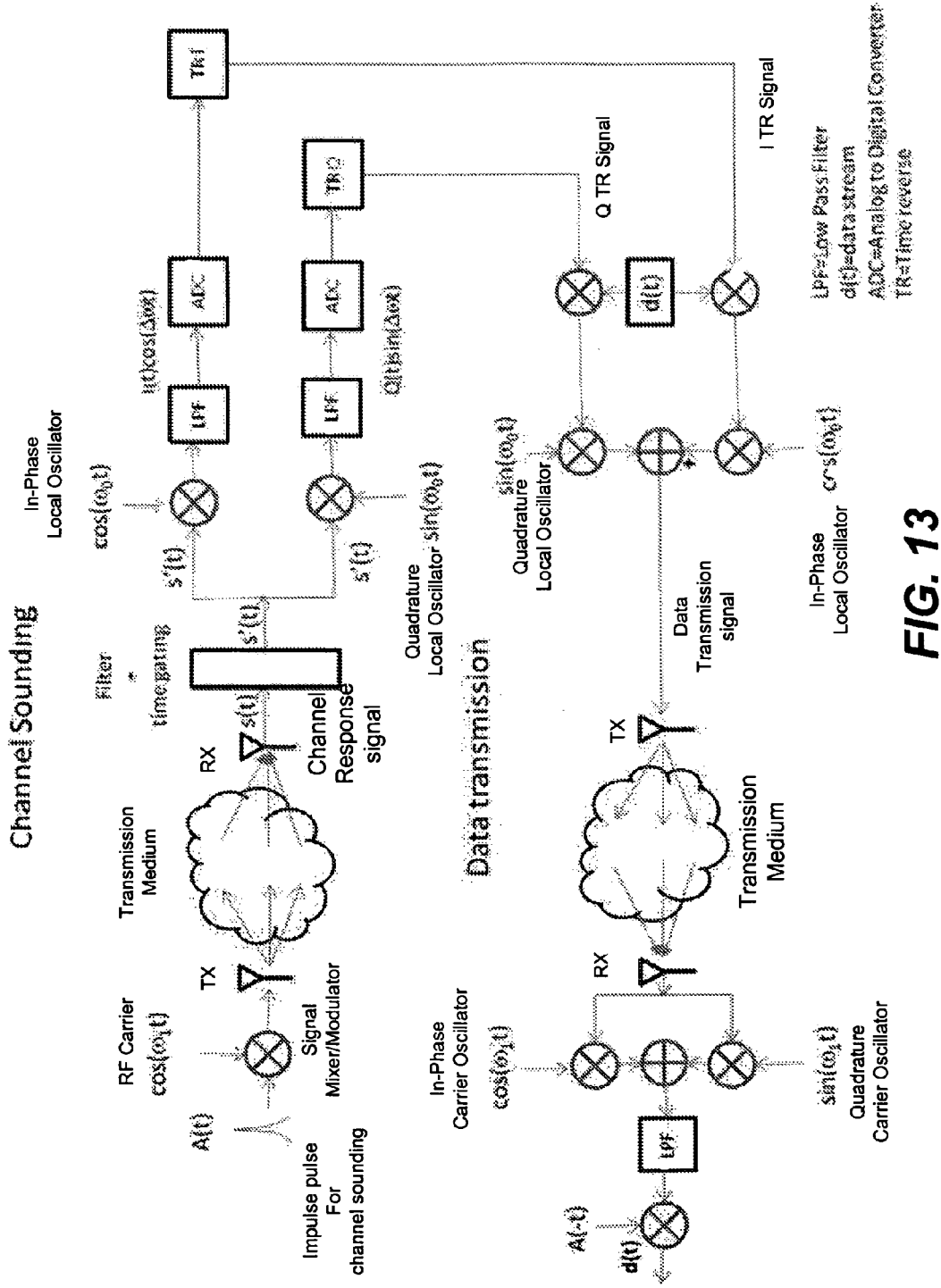
FIG. 13 shows an example of channel sounding, data modulation, data transmission and data detection in RF transmission based time reversal using quadrature modulation.
Figure 14:
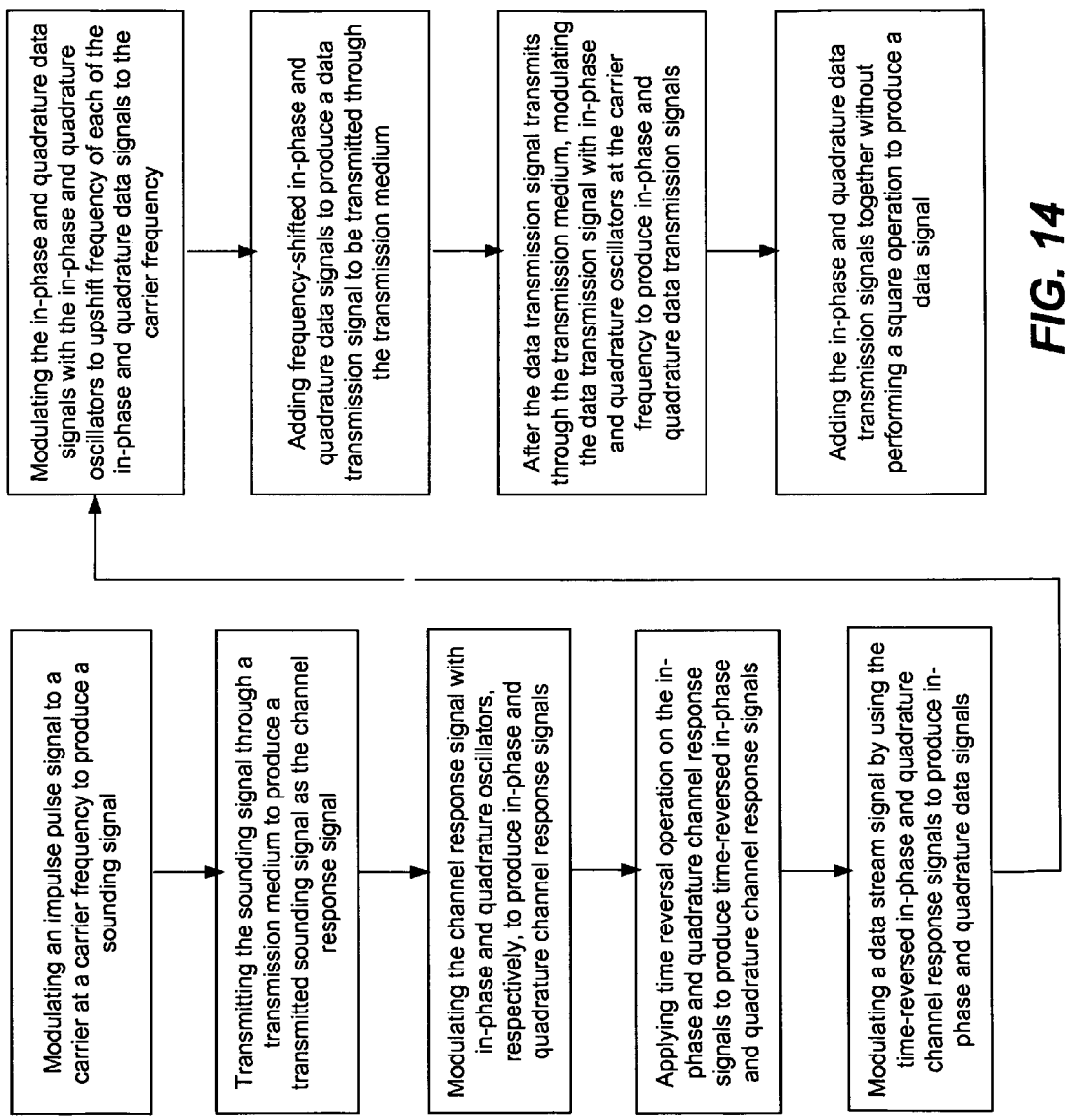
FIG. 14 shows an example of the operations in the example in FIG. 13.

FIG. 13 shows an example of channel sounding, data modulation, data transmission and data detection in RF transmission based time reversal using quadrature modulation. FIG. 14 shows the flow of the above operations of the system in FIG. 14.

In FIG. 13, the upper portion shows the channel sounding process to produce a channel response signal that characterizes the transmission medium through which the data transmission based on time reversal is carried out. At the target, an impulse pulse signal is modulated onto a carrier at a carrier frequency to produce a sounding signal. This sounding signal is transmitted by the target transmitter antenna through the transmission medium towards the base at the other side of the transmission medium. The transmitted sounding signal received at the base is the channel response signal.

At the base, the channel response signal is received by the base receiver antenna and the received channel response is first filtered and may undergo other signal processing if required and subsequently the signal split into two copies. The two copies are modulated with in-phase and quadrature oscillators at a local oscillator frequency, respectively, to produce two modulated signals. The in-phase and quadrature oscillators are out of phase by 90 degrees with respect to each other. The two modulated signals are filtered to produce in-phase and quadrature channel response signals at the differential frequency between the carrier frequency and the local oscillator frequency. The in-phase and quadrature channel response signals are time reversed to produce time-reversed in-phase and quadrature channel response signals for data transmission.

Next, a data stream signal d(t) to be transmitted from the base to the target is modulated by using the time-reversed in-phase and quadrature channel response signals to produce in-phase and quadrature data signals. These in-phase and quadrature data signals are equalized in amplitude and then are modulated with the in-phase and quadrature oscillator signals at the same local oscillator frequency previously used to upshift the frequency of each of the in-phase and quadrature data signals to the carrier frequency. The frequency-shifted in-phase and quadrature data signals are then added at a signal mixer to produce the actual data transmission signal to be transmitted through the transmission medium to the target. The base transmitter is used to send out the data transmission signal at the carrier frequency to the target.

After the data transmission signal transmits through the transmission medium to reach the target, the received data transmission signal at the target is split into two copies which are modulated with in-phase and quadrature oscillators at the carrier frequency to produce in-phase and quadrature data transmission signals. A signal adder is used to directly add the in-phase and quadrature data transmission signals together without performing a square or other non-linear detection operation to produce a data signal for extracting the data stream d(t).

The signal processing details of the above operations are described below. The sounding signal produced at the target for the impulse pulse of a pulse duration $T_0$ can be expressed as $$q(t) = A(t)\cos(\omega_1 t) \quad (6)$$

where the carrier frequency is $\omega_1$. This signal transmits through the multipath channel as $$s_j(t) = \sum_{i=1}^{n} \alpha_{i,j} A(t - \tau_{i,j}) \cos(\omega_1 (t - \tau_{i,j})) \quad (7)$$

For notational convenience we will drop the subscript j or alternatively derive the result for a single TX antenna $$s(t) = \sum_{i=1}^{n} \alpha_i A(t - \tau_i) \cos(\omega_1 (t - \tau_i)) \quad (8)$$

The signal can be written in IQ format for the in-phase branch (I) and quadrature branch (Q) as $$s(t) = \sum_{i=1}^{n} [\alpha_i A(t - \tau_i) \cos(\omega_1 \tau_i)] \cos(\omega_1 t) + \sum_{i=1}^{n} [\alpha_i A(t - \tau_i) \sin(\omega_1 \tau_i)] \sin(\omega_1 t) \quad (9)$$

which can be written as $$s(t) = I(t)\cos(\omega_1 t) + Q(t)\sin(\omega_1 t) \quad (10)$$

where $$I(t) = \sum_{i=1}^{n} [\alpha_i A(t - \tau_i) \cos(\omega_1 \tau_i)] \quad (11)$$

$$Q(t) = \sum_{i=1}^{n} [\alpha_i A(t - \tau_i) \sin(\omega_1 \tau_i)]$$

I(t) and Q(t) can be recovered by first splitting the signal s(t) into two copies, multiplying each copy by quadrature local oscillator signals and capturing each separately in a sampling device with a sampling frequency at least 2× the highest frequency component in the signal. This will produce two quadrature signals $$I(t)\cos[(\omega_1-\omega_0)]t$$

$$Q(t)\sin[(\omega_1-\omega_0)]t \tag{12}$$

The signal at the differential frequency ($\omega_1-\omega_0$) is an intermediate frequency which can be captured in the sampling device or may be useful for additional processing, but this permits the special case $\omega_1=\omega_0$ which represents a downshift to baseband. For simplicity we will assume $\omega_1=\omega_0$. Due to the multipath it is not possible to remove the terms $\cos(\omega_1\tau_i)$ and $\sin(\omega_1\tau_i)$ by squaring and adding due to the many cross terms that arise when the summation terms are squared. Hence these terms are fading terms which will vary randomly depending on the multipath details.

At this stage, the two quadrature signals are digitized and time reversed:

$$I^{TR}(t) = \sum_{i=1}^{n}[\alpha_i A(2T_0 + (2\tau_n - \tau_i) - t)\cos(\omega_1\tau_i)] \tag{13}$$

$$Q^{TR}(t) = \sum_{i=1}^{n}[\alpha_i A(2T_0 + (2\tau_n - \tau_i) - t)\sin(\omega_1\tau_i)]$$

where $T_0$ denotes the duration of the pilot pulse, $\tau_n$ denotes the maximum arrival delay of the last multipath echo and $\tau_i$ is the delay of the ith multipath component.

We first IQ upshift the signal to the original carrier frequency (or a different carrier frequency) and sum the terms, giving a resultant signal $$s'(t)=I^{TR}(t)\cos(\omega_1 t)-Q^{TR}(t)\sin(\omega_1 t) \tag{14}$$

To represent propagation of a time-reversed signal, we apply a transformation $t \rightarrow t-\tau_i^R$. At the peak of the TR signal, all the delays are equalized i.e. $\tau_i^R-\tau_i=0$ for all values i. In practice if reciprocity is not perfectly maintained this term may not equal zero and create noise and fading effects. The full expression for the signal arriving at the receiver, assuming rescaling to peak launch power is $$p(t) = \sum_{i=1}^{n}\left[\frac{\alpha_i^2}{\alpha_1}A(2(T_0 + \tau_n) + (\tau_i^R - \tau_i) - t) \right. \tag{15}$$

$$\left. [\cos(\omega_1\tau_i)\cos(\omega_1(t-\tau_i^R)) - \sin(\omega_1\tau_i)\sin(\omega_1(t-\tau_i^R))]\right]$$

This signal is then downshifted by mixing with in-phase and quadrature local oscillators giving a baseband signal. The two recovered components are then simply summed without any subsequent detection process giving the signal:

$$P(t) = \sum_{i=1}^{n}\left[\frac{\alpha_i^2}{\alpha_1}A(2(T_0 + \tau_n) + (\tau_i^R - \tau_i) - t) \right. \tag{16}$$

$$\left. [\cos(\omega_1\tau_i)\cos(\omega_1\tau_i^R) + \sin(\omega_1\tau_i)\sin(\omega_1\tau_i^R)]\right]$$

If $\tau_i^R=\tau_i$ when there is perfect reciprocity, this signal simplifies to the ideal TR signal.

$$P(t) = \sum_{i=1}^{n}\left[\frac{\alpha_i^2}{\alpha_1}A(2(T_0 + \tau_n) - t)[\cos^2(\omega_1\tau_i) + \sin^2(\omega_1\tau_i)]\right]$$

which further reduces to the ideal time reversed signal since $\cos^2+\sin^2=1$ $$P(t+2(T_0+\tau_n)) = \sum_{i=1}^{n}\left[\frac{\alpha_i^2}{\alpha_1}A(-t)\right] = \frac{A(-t)}{\alpha_1}\sum_{i=1}^{n}\alpha_i^2 \tag{17}$$

The term $2(T_0+\tau_n)$ can be dropped if we assume it is a fixed delay for each term which arises because we must wait for the entire channel response to be captured before we can retransmit the time-reversed version, but the resulting signal is non-causal. This can be done for mathematical simplicity but physical calculations should include the term.

If reciprocity is not perfect, the signal is $$P(t) = \sum_{i=1}^{n}\left[\frac{\alpha_i^2}{\alpha_1}A(2(T_0+\tau_n)+(\tau_i^R-\tau_i)-t)\cos(\omega_1(\tau_i-\tau_i^R))\right] \tag{18}$$

Experimental measurements indicate that realistic values of ($\tau_i^R-\tau_i$) are not enough to seriously degrade the temporal alignment of the signals $A(2(T_0+\tau_n)+(\tau_i^R-\tau_i)-t)$ at the peak, although as the temporal duration of the pilot signal becomes shorter the sensitivity to this term will rise. A significant signal term is $\cos(\omega_1(\tau_i-\tau_i^R))$ because the term $\omega_1(\tau_i-\tau_i^R)$ is multiplied by a large term $\omega_1$ which could be very large at, e.g., MMW, THz or optical frequencies. This signal in the low GHz can still create significant fading effects. Our system recognizes the importance of this term and applies control mechanisms that reduce $\omega_1(\tau_i-\tau_i^R)$ to an acceptable level. This may involve stabilizing the system to minimize changes or sounding the channel at a rate which reduces this variation to a minimal level or applying advanced DSP techniques to eliminate the effect of the term. We refer to systems where the value of $\omega_1(\tau_i-\tau_i^R)$ is kept within bounds that do not degrade the system performance as quasi-static channels.

The reciprocity can fail for multiple reasons. One cause is temporal variation such that the return channel response has changed compared to the captured channel response during the sounding procedure. This can happen due to change in the environment or much more significantly due to motion of the end points. This effect would normally be controlled by re-sounding the channel on a frequent timescale and using the new channel response.

In operation, the input (ADC) and output (DAC) sampling clocks at the TX are synchronized and preferably should have identical clocks. If there is a mismatch at this point, this will effectively rescale the values $\tau_i$ causing them not to match the delays built into the physical channel. Mismatches in the clocks at either end of the link have a different effect. Since the RX originally generates the sounding pulse digitally in the DAC, since the TR channel response is composed of echoes of the original pulse, then the individual pulses may have a different duration $T'_0$ on the down link path than on the uplink. This typically will not have any effect on signal components generated in the analog circuits, but only in the digital sections, namely the DACs at either end. Mismatch of the local oscillators at either end of the link may result in the signal having a slight beat frequency during the sampling. This will then produce a fading effect rather than an IF frequency. Hence, the IF cycle time should be significantly shorter than a single pulse.

Although a few variations have been described in detail above, other modifications are possible. For example, the logic flow depicted in the accompanying figures and described herein do not require the particular order shown, or sequential order, to achieve desirable results.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. Variations and enhancements of the described implementations and other implementations can be made based on what is described and illustrated in this document.

What is claimed is:

1. A method comprising:
   detecting at a base a channel impulse response, comprising copies of an impulse-pulse emitted by a remote target, modulated at a first carrier frequency, wherein each copy is received at a different time based on a length of a respective path traveled by the respective copy through a communication channel;
   obtaining at the base the channel impulse response modulated at an intermediate frequency by combining the detected channel impulse response modulated at the first carrier frequency with a signal generated at the base and having a first frequency, wherein the intermediate frequency is a difference between the first carrier frequency and the first frequency;
   digitizing at the base the obtained channel impulse response modulated at the intermediate frequency into a channel impulse response waveform;
   storing at the base the channel impulse response waveform;
   performing a time-reversal operation on the stored channel impulse response waveform, wherein the time-reversal operation includes adding a time delay, which is determined based on both a time to receive the channel impulse response waveform at the base from the remote target and a time to reverse in the time domain the stored channel impulse response waveform;
   preparing a data signal comprising a copy of the time reversed channel impulse response waveform corresponding to each bit of a data stream that comprises information to be provided to the remote target;
   modulating the prepared data signal at a transmission frequency; and
   transmitting the modulated data signal from the base to the remote target.

2. The method of claim 1, wherein preparing the data signal comprises preparing the data signal so as to provide the transmitted data signal to the remote target as substantially the data stream.

3. The method as in claim 1 further comprising:
   extracting an envelope of the channel impulse response waveform to obtain a waveform of the channel impulse response at base band; and
   replacing the channel impulse response waveform with the waveform of the channel impulse response at the base band.

4. The method as in claim 1 wherein, when the first frequency is substantially equal to the first carrier frequency, obtaining the channel impulse response at base band.

5. The method as in claim 4 further comprising:
   digitizing the obtained channel impulse response modulated at the base band to obtain the channel impulse response waveform.

6. The method as in claim 1 wherein, when the channel impulse response waveform is independent of a carrier frequency, then the preparing further comprises modulating the data signal at a second carrier frequency.

7. A base for providing communications to a remote target, the base comprising:
   a receiver to acquire a channel impulse response comprising a set of copies of an impulse-pulse emitted by the remote target, each copy arriving at the base at a different time in accordance to a length of a respective path traveled by the respective copy through a communication channel between the target and the base, wherein the receiver comprises:
      a detector to detect the channel impulse response modulated at a carrier frequency,
      a first oscillator to generate a first local signal at a first frequency,
      a first mixer having a first input coupled to the detector and a second input coupled to the first oscillator, the first mixer to combine the detected channel impulse response modulated at the carrier frequency with the first local signal at the first frequency to obtain the channel impulse response modulated at a first intermediate frequency, wherein the first intermediate frequency is equal to a difference between the carrier frequency and the first frequency, and
      an analog-to-digital converter (ADC) downstream from the first mixer, the ADC configured to digitize the obtained channel impulse modulated at a lowest intermediate frequency into a channel impulse response waveform;
   a waveform processor communicatively coupled to the receiver, the waveform processor comprising storage configured to store and reverse in time domain the channel impulse response waveform; and
   a transmitter configured to emit a data signal, the transmitter comprising:
      a multiplexer communicatively coupled to the waveform processor, the multiplexer configured to produce the data signal comprising a copy of the time reversed channel impulse response waveform for each bit of a data stream that comprises information to be provided to the remote target, wherein the time reversed channel impulse response waveform includes a time delay, which is determined based on both a time to receive the channel impulse response waveform at the base from the remote target and a time to reverse in the time domain the stored channel impulse response waveform.

8. The base as in claim 7, wherein the receiver further comprises:
   a first filter coupled to the output of the first mixer and disposed upstream from the ADC, the first filter configured to select the channel impulse response modulated at the first intermediate frequency.

9. The base as in claim 8, wherein the receiver further comprises:
   a second oscillator to generate a second local signal at a second frequency; and a second mixer having a first input communicatively coupled to the output of the first filter and a second input coupled to the second oscillator, the second mixer configured to combine the selected channel impulse response modulated at the first intermediate frequency with the second local signal at the second frequency to obtain the channel impulse response modulated at a second intermediate frequency, wherein the second intermediate frequency is equal to a difference between the first intermediate frequency and the second frequency.

10. The base as in claim 9, wherein the receiver further comprises:
a second filter coupled to the output of the second mixer and disposed upstream from the ADC, the second filter configured to select the channel impulse response modulated at the second intermediate frequency.

11. The base as in claim 10 wherein, when the second frequency is substantially equal to the first intermediate frequency, obtaining the channel impulse response at base band.

12. The base as in claim 7, wherein the carrier frequency comprises an optical frequency.

13. The base as in claim 12, wherein the communication channel between the target and the base comprises a multimode optical fiber.

14. A communication method comprising:
acquiring at a base, a channel impulse response comprising copies of an impulse-pulse emitted by a remote target, each copy arriving at the base at a different time in accordance to a length of a respective path traveled by the respective copy through a communication channel between the remote target and the base, wherein acquiring the channel impulse response comprises:
detecting at the base the channel impulse response modulated at a carrier frequency,
obtaining the channel impulse response modulated at an intermediate frequency by combining the detected channel impulse response modulated at the carrier frequency with a signal generated at the base and having a first frequency, wherein the intermediate frequency is a difference between the carrier frequency and the first frequency,
digitizing the obtained channel impulse response modulated at the intermediate frequency into a channel impulse response waveform, and
storing the channel impulse response waveform;
transmitting a data stream comprising information from the base to the target, wherein the transmitting comprises:
performing a time-reversal operation on the stored channel impulse response waveform, wherein the time reversed channel impulse response waveform includes a time delay, which is determined based on both a time to receive the channel impulse response waveform at the base from the remote target and a time to reverse in the time domain the stored channel impulse response waveform,
preparing a data signal comprising a copy of the time reversed channel impulse response waveform corresponding to each bit of the data stream, and
emitting the prepared data signal.

15. A method comprising:
detecting at a target, a channel impulse response, h(t), comprising a set of copies of an impulse-pulse, s(t), emitted by a central base, each copy of the impulse pulse s(t) arriving at the target at a different time in accordance to a length of a respective path traveled by the respective copy through a communication channel between the central base and the target;
digitizing the detected channel impulse response h(t) into a channel impulse response waveform, H(t);
storing the channel impulse response waveform, H(t);
performing a time-reversal operation on the stored channel impulse response waveform, H(t), to obtain a time reversed channel impulse response waveform H(−t) in time domain;
preparing a data signal comprising a copy of the time reversed channel impulse response waveform H(−t) corresponding to each bit of a data stream that comprises information to be provided to the remote target, s(t); and
transmitting the prepared data signal from the target to the central base.

16. The method of claim 15, wherein preparing the data signal comprises preparing the data signal so as to provide the transmitted data signal to the central base as substantially the data stream.

17. An apparatus comprising:
a receiver to acquire a channel impulse response, h(t), comprising a set of copies of an impulse-pulse, s(t), emitted by a central base, each copy arriving at the receiver at a different time in accordance to a length of a respective path traveled by the respective copy of the impulse-pulse s(t) through a communication channel between the central base and the receiver, wherein the receiver comprises:
a detector to detect the channel impulse response, h(t), and
an analog-to-digital converter (ADC) coupled to the detector to digitize the detected channel impulse h(t) into a channel impulse response waveform H(t);
a waveform processor communicatively coupled to the receiver, the waveform processor comprising storage configured to store and perform a time-reversal operation on the stored channel impulse response waveform H(t) to obtain a time reversed channel impulse response waveform H(−t) in time domain; and
a transmitter to emit an analog data signal, the transmitter comprising:
a multiplexer communicatively coupled to the waveform processor, the multiplexer configured to produce the data signal comprising a copy of the time reversed channel impulse response waveform H(−t) for each bit of a data stream s(t) that comprises information to be provided to a remote target, and
a digital to analog converter to reconvert the data signal to the analog data signal.

18. A method comprising:
emitting an impulse-pulse s(t);
detecting a self-convolved channel impulse response, h(t)*h(t), wherein:
the channel impulse response, h(t), comprises a set of copies of the impulse-pulse s(t), each copy of the impulse-pulse s(t) provided to a remote target at a different time in accordance to a length of a respective path traveled by the respective copy of the impulse-pulse s(t) through a communication channel between a base and the remote target, and
the self-convolved channel impulse response, h(t)*h(t), comprises a copy of the channel impulse response h(t) for each copy of the impulse-pulse s(t) included in the channel impulse response h(t) and reflected at the remote target;

perform a time-reversal operation on the self-convolved channel impulse response, h(t)*h(t) to obtain a time reversed self-convolved channel impulse response waveform h(−t)*h(−t) in time domain;

transmitting the time reversed self-convolved channel impulse response, h(−t)*h(−t), from the base to the remote target; and detecting a data stream, s(t), emitted by the remote target, wherein:

each bit of the detected data stream comprises copies of the impulse-pulse s(t) included in a time reversed channel impulse response, h(−t), received from the remote target for each respective bit, each copy of the impulse-pulse s(t) arriving at the base at the same time, and the time reversed channel impulse response, h(−t), comprises respective copies of the impulse-pulse s(t) formed at the remote target from the copies of the impulse-pulses s(t) included in the transmitted time reversed self-convolved channel impulse response, h(−t)*h(−t) provided to the remote target at respectively the same time.

19. A method comprising:

reflecting a channel impulse response, h(t), comprising a set of copies of an impulse-pulse s(t) received from a central base, each copy of the impulse-pulse s(t) arriving at a target at a different time in accordance to a length of a respective path traveled by the respective copy of the impulse-pulse s(t) through a communication channel between the central base and the target;

detecting a time reversed channel impulse response, h(−t), comprising respective copies of the impulse-pulse s(t) formed at the remote target from the copies of the impulse-pulses s(t) included in the time reversed self-convolved channel impulse response, h(−t)*h(−t) received from the central base arriving at the target at respectively the same time;

digitizing the detected time reversed channel impulse response h(−t) into a time reversed channel impulse response waveform, H(−t);

storing the time reversed channel impulse response waveform, H(−t);

preparing a data signal comprising a copy of the time reversed channel impulse response waveform H(−t) corresponding to each bit of a data stream that comprises information to be provided to the remote target, s(t); and transmitting the prepared data signal from the target to the central base.

20. The method of claim 19, wherein preparing the data signal comprises preparing the data signal so as to provide the transmitted data signal to the central base as substantially the data stream.

21. A method comprising:

detecting a first data stream, s1($t$), received from a first remote target;

emitting a copy of a time reversed second channel impulse response h2(−t) for each bit of the detected first data stream s1($t$), wherein the second channel impulse response, h2($t$), comprises a set of copies of a second impulse-pulse, $\delta_2$(t), emitted by a second remote target, each copy of the impulse-pulse $\delta_2$(t) arriving at a base at a different time in accordance to a length of a respective path traveled by the respective copy of the impulse-pulse $\delta_2$(t) through a second communication channel between the base and the second remote target;

detecting a second data stream, s2($t$), received from the second remote target; and emitting a copy of a time reversed first channel impulse response h1(−t) for each bit of the detected second data stream s2($t$), wherein the first channel impulse response, h1($t$), comprises a set of copies of a first impulse-pulse, $\delta_1$(t), received from the first remote target, each copy of the impulse-pulse $\delta_1$(t) arriving at the base at a different time in accordance to a length of a respective path traveled by the respective copy of the impulse-pulse $\delta_1$(t) through a first communication channel between the base and the first remote target.

22. The method of claim 21, wherein:

emitting the copy of the time reversed first channel impulse response h1(−t) for each bit of the detected second data stream s2($t$) comprises providing only the second data stream s2($t$) to the first remote target; and emitting the copy of the time reversed second channel impulse response h2(−t) for each bit of the detected first data stream s1($t$) comprises providing only the first data stream s1($t$) to the second remote target.

23. A method comprising:

detecting a signal comprising a data stream s(t) included with a background signal, wherein:

a data signal emitted by a central base comprises a copy of a channel impulse response, h(t), for each bit of the data stream, s(t), the channel impulse response, h(t), comprises a set of copies of an impulse-pulse s(t) emitted by a target, each copy of the impulse-pulse s(t) arriving at the central base at a different time in accordance to a length of a respective path traveled by the respective copy of the impulse-pulse s(t) through a communication channel between the target and the central base, and the background signal having a statistically constant average of each impulse-pulse s(t) and a variance determined by a bit pattern of the data stream s(t) over a number of bits equal to substantially twice the temporal extent of the set of copies of the impulse-pulse s(t) included in the time reversed version of the channel impulse response, h(t) that is retransmitted into the system;

splitting the detected signal into a first and second detected signals;

delaying the second detected signal by a time interval equivalent to the length of a bit; and subtracting the delayed second detected signal from the first detected signal to obtain a differentiated signal free from the statistically constant average of the background signal.

24. The method of claim 23, further comprising filtering the differentiated signal to recover the data stream s(t) received from the central base, the recovered data stream s(t) free from the statistically constant average of the background signal.

25. A receiver comprising:

a detector to detect a signal comprising a data stream s(t) included with a background signal, wherein:

a data signal emitted by a central base comprises a copy of a channel impulse response, h(t), for each bit of the data stream, s(t), the channel impulse response, h(t), comprises a set of copies of an impulse-pulse s(t) emitted by a target, each copy of the impulse-pulse s(t) provided to the central base at a different time in accordance to a length of a respective path traveled by the respective copy of the impulse-pulse s(t) through a communication channel between the target and the central base, and the background signal having a statistically constant average of each impulse-pulse s(t) and a variance determined by a bit pattern of the data stream s(t) over a number of bits equal to twice a size of the set of copies of the impulse-pulse s(t) included in the channel impulse response, h(t);

a splitter coupled with the detector, the splitter configured to split the detected signal into a first and second detected signals;

a delay stage coupled to a first output of the splitter configured to delay the first detected signal by a time interval equivalent to the length of a bit; and a differentiator having a first input coupled to the output of the delay stage and a second input coupled to the second output of the splitter, the differentiator configured to subtract the delayed first detected signal from the second detected signal to obtain a differentiated signal free from the statistically constant average of the background signal.

26. The receiver of claim 25, further comprising a channel filter coupled at the output of the differentiator, the integrator configured to integrate the differentiated signal to recover the data stream s(t) received from the central base, the recovered data stream s(t) free from the statistically constant average of the background signal.

27. A base for providing communications to a remote target, the base comprising:

a receiver to acquire a channel impulse response comprising a set of copies of an impulse-pulse emitted by the remote target, each copy arriving at the base at a different time in accordance to a length of a respective path traveled by the respective copy through a communication channel between the target and the base, wherein the receiver comprises:

a detector to detect the channel impulse response modulated at a carrier frequency, a first oscillator to generate a first local signal at a first frequency, a first mixer having a first input coupled to the detector and a second input coupled to the first oscillator, the first mixer to combine the detected channel impulse response modulated at the carrier frequency with the first local signal at the first frequency to obtain the channel impulse response modulated at a first intermediate frequency, wherein the first intermediate frequency is equal to a difference between the carrier frequency and the first frequency, and an analog-to-digital converter (ADC) downstream from the first mixer, the ADC configured to digitize the obtained channel impulse modulated at a lowest intermediate frequency into a channel impulse response waveform;

a waveform processor communicatively coupled to the receiver, the waveform processor comprising storage configured to store and perform a time-reversal operation on the channel impulse response waveform, wherein the time-reversal operation includes adding a time delay, which is determined based on both a time to receive the channel impulse response waveform at the base from the remote target and a time to reverse in the time domain the stored channel impulse response waveform; and a transmitter configured to emit an analog data signal modulated at a second carrier frequency, the transmitter comprising:

a multiplexer communicatively coupled to the waveform processor, the multiplexer configured to produce a data signal comprising a copy of the time reversed channel impulse response waveform for each bit of a data stream that comprises information to be provided to the remote target, an digital-to-analog converter (DAC) downstream from the multiplexer, the DAC configured to convert the produced data signal into the analog data signal, a second oscillator to generate a second local signal at the second frequency, and a second mixer having a first input coupled to the DAC and a second input coupled to the second oscillator, the second mixer to combine the analog data signal with the second local signal at the second frequency to obtain the analog data signal modulated at a second carrier frequency, wherein the second carrier frequency is equal to the difference between the second frequency and baseband frequency.

28. A communication system, comprising:

a target transceiver including a target transmitter that produces a target signal carried by a carrier signal at a carrier frequency, and a target receiver that includes an in-phase carrier oscillator and a quadrature carrier oscillator that operate at the carrier frequency and are out of phase by 90 degrees with respect to each other, an in-phase signal mixer that mixes a received signal with an in-phase carrier oscillator signal from the in-phase carrier oscillator to produce a first signal, a quadrature signal mixer that mixes the received signal with a quadrature carrier oscillator signal from the quadrature carrier oscillator to produce a second signal, and a signal adder that adds the first and second signals to produce a received output signal; and a base transceiver including a base receiver and a base transmitter, wherein the base receiver includes an in-phase local oscillator and a quadrature local oscillator that operate at a local oscillator frequency and are out of phase by 90 degrees with respect to each other, an in-phase signal mixer that mixes a received signal at the base receiver with an in-phase local oscillator signal from the in-phase local oscillator to produce a first signal, a quadrature signal mixer that mixes the received signal with a quadrature local oscillator signal from the quadrature local oscillator to produce a second signal, an in-phase time reversal processor that performs time reversal on the first signal, and a quadrature time reversal processor that performs time reversal on the second signal, and wherein the base transmitter includes a first in-phase signal mixer that mixes the time reversed first signal with a data signal to produce an in-phase data signal, a first quadrature signal mixer that mixes the time reversed second signal with the data signal to produce a quadrature data signal, a second in-phase signal mixer that mixes the in-phase data signal with the in-phase local oscillator signal to produce an in-phase frequency upshifted data signal, a second quadrature signal mixer that mixes quadrature data signal with the quadrature local oscillator signal to produce a quadrature frequency upshifted data signal, and a base transmitter adder that adds the in-phase and quadrature frequency upshifted data signals to produce a base transmission data signal to transmit to the target receiver.

29. A method for communications between a target transceiver and a base transceiver, comprising:

operating the target transceiver to produce a channel sounding signal to characterize a transmission medium between the target and base transceivers, the channel sounding signal includes an impulse pulse signal modulated onto a carrier at a carrier frequency;

operating the target transceiver to transmit the channel sounding signal through the transmission medium towards the base transceiver;

operating the base transceiver to receive the channel sounding signal as a channel response signal;

operating the base transceiver to split the channel response signal into two copies;

operating the base transceiver to modulate the two copies with in-phase and quadrature oscillators at a local oscillator frequency, respectively, to produce two modulated signals;

operating the base transceiver to filter the two modulated signals to produce in-phase and quadrature channel response signals at a differential frequency between the carrier frequency and the local oscillator frequency;

operating the base transceiver to perform time reversal on the in-phase and quadrature channel response signals to produce time-reversed in-phase and quadrature channel response signals for data transmission to the target transceiver;

operating the base transceiver to modulate a data stream signal d(t) onto the time-reversed in-phase and quadrature channel response signals to produce in-phase and quadrature data signals;

operating the base transceiver to modulate the in-phase and quadrature data signals with the in-phase and quadrature oscillator signals at the local oscillator frequency to upshift the frequency of each of the in-phase and quadrature data signals to the carrier frequency;

operating the base transceiver to add the frequency-shifted in-phase and quadrature data signals to produce a data transmission signal to be transmitted through the transmission medium to the target transceiver;

operating the target transceiver to split the data transmission signal into two copies;

operating the target transceiver to modulate the two copies with in-phase and quadrature oscillators at the carrier frequency, respectively, to produce in-phase and quadrature data transmission signals; and operating the target transceiver to add the in-phase and quadrature data transmission signals together to produce a data signal for extracting the data signal.

* * * * *